United States Patent
Bai et al.

(10) Patent No.: US 12,494,878 B2
(45) Date of Patent: *Dec. 9, 2025

(54) ENHANCED TRACKING REFERENCE SIGNAL PATTERNS

(71) Applicant: QUALCOMM Incorporated, San Diego, CA (US)

(72) Inventors: Tianyang Bai, Mountain View, CA (US); Wooseok Nam, San Diego, CA (US); Sungwoo Park, San Diego, CA (US); Kiran Venugopal, Green Brook, NJ (US); Tao Luo, San Diego, CA (US); Junyi Li, Fairless Hills, PA (US); Jung Ho Ryu, Fort Lee, NJ (US); Qian Zhang, Basking Ridge, NJ (US); Ling Ding, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,046

(22) Filed: Dec. 11, 2023

(65) Prior Publication Data

US 2024/0106598 A1     Mar. 28, 2024

Related U.S. Application Data

(63) Continuation of application No. 17/318,985, filed on May 12, 2021, now Pat. No. 11,870,721.

(Continued)

(51) Int. Cl.
*H04L 5/00* (2006.01)
*H04W 72/23* (2023.01)
*H04W 72/51* (2023.01)

(52) U.S. Cl.
CPC ........... *H04L 5/0048* (2013.01); *H04W 72/23* (2023.01); *H04W 72/51* (2023.01)

(58) Field of Classification Search
CPC ... H04L 5/0053; H04L 5/0048; H04L 5/0007; H04L 5/0094; H04L 27/0014;
(Continued)

(56) References Cited

U.S. PATENT DOCUMENTS 9,107,213 B2 *   8/2015   Ng ........................ H04L 5/0005
9,571,248 B2 *   2/2017   Yi ......................... H04L 5/0048
(Continued)

FOREIGN PATENT DOCUMENTS

CN         110226351 A        9/2019
WO         WO-2018145104      8/2018
(Continued)

OTHER PUBLICATIONS

CATR: "Consideration on the TRS Design for NR", 3GPP Draft, 3GPP TSG RAN WG1 Meeting NR#3, R1-1716655, vol. RAN WG1, No. Nagoya, Japan, Sep. 18, 2017-Sep. 21, 2017, Sep. 17, 2017 (Sep. 17, 2017), XP051340105, 4 Pages, Retrieved from the Internet: URL: http://www.3gpp.org/ftp/Meetings_3GPP_SYNC/RAN1/Docs/. [Retrieved on Sep. 17, 2017]. Sections 1-3.

(Continued)

*Primary Examiner* — Man U Phan
(74) *Attorney, Agent, or Firm* — Holland & Hart LLP/QUALCOMM Incorporated

(57) ABSTRACT

Methods, systems, and devices for wireless communications are described. A user equipment (UE) may transmit, to a base station, a UE capability to receive a first portion of a tracking reference signal (TRS) and a second portion of the TRS, the first portion and the second portion associated with a TRS pattern. The UE may receive, from the base station, an indication of the TRS pattern, where the TRS pattern (Continued)

includes the first portion of the TRS pattern and the second portion of the TRS pattern. The UE may receive one or more TRSs according to the first portion of the TRS pattern and the second portion of the TRS pattern.

28 Claims, 18 Drawing Sheets

Related U.S. Application Data

(60) Provisional application No. 63/025,130, filed on May 14, 2020.

(58) Field of Classification Search
CPC . H04L 27/2675; H04L 5/0091; H04L 27/261; H04L 5/00; H04W 72/048; H04W 72/042; H04W 72/04
USPC ......................................................... 370/329
See application file for complete search history.

(56) References Cited

U.S. PATENT DOCUMENTS

| | | | |
|---|---|---|---|
| 10,498,477 B2* | 12/2019 | John Wilson | H04L 5/0048 |
| 10,548,079 B2 | 1/2020 | Lee et al. | |
| 10,637,625 B2* | 4/2020 | Chuang | H04L 25/0232 |
| 10,644,923 B2* | 5/2020 | Nam | H04L 5/0082 |
| 10,680,780 B2* | 6/2020 | Kim | H04L 1/0026 |
| 10,834,625 B2* | 11/2020 | Vintola | H04W 28/065 |
| 10,951,453 B2* | 3/2021 | Nam | H04L 5/0048 |
| 11,044,668 B2* | 6/2021 | Lee | H04W 52/0216 |
| 11,234,104 B2* | 1/2022 | Duan | H04L 27/261 |
| 11,362,715 B2* | 6/2022 | Noh | H04L 5/0051 |
| 11,582,712 B2* | 2/2023 | Chen | H04W 72/23 |
| 2020/0053703 A1* | 2/2020 | Akkarakaran | G01S 1/20 |
| 2021/0045004 A1* | 2/2021 | Vintola | H04L 5/001 |
| 2021/0153162 A1 | 5/2021 | Chen et al. | |
| 2021/0250786 A1* | 8/2021 | Luo | H04L 5/005 |
| 2021/0359812 A1 | 11/2021 | Bai et al. | |
| 2021/0359892 A1* | 11/2021 | Bai | H04W 72/0446 |
| 2022/0060298 A1* | 2/2022 | Taherzadeh Boroujeni | H04L 27/2613 |
| 2022/0070823 A1* | 3/2022 | Ma | H04W 72/02 |
| 2022/0145837 A1* | 5/2022 | Shen | H04L 5/0082 |

FOREIGN PATENT DOCUMENTS

| | | |
|---|---|---|
| WO | 2019029711 A1 | 2/2019 |
| WO | 2019033038 | 2/2019 |

OTHER PUBLICATIONS

International Preliminary Report On Patentability—PCT/US2021/032225—The International Bureau of WIPO—Geneva, Switzerland—Nov. 24, 2022 (204627WO).
International Search Report and Written Opinion—PCT/US2021/032225—ISA/EPO—Sep. 7, 2021 (204627WO).
3GPP: "3rd Generation Partnership Project, Technical Specification Group Radio Access Network, NR, Physical Layer Procedures for Data (Release 15)", 3GPP Organizational Partners, Sophia Antipolis Valbonne, France, 3GPP TS 38.214 V15.9.0, Mar. 2020, 7 pages, Section 5.1.6.1.1.
European Search Report—EP25191858—Search Authority—The Hague—Oct. 22, 2025.

* cited by examiner

ENHANCED TRACKING REFERENCE SIGNAL PATTERNS

CROSS REFERENCE

The present application for patent is a continuation of U.S. patent application Ser. No. 17/318,985 by BAI et al., entitled "ENHANCED TRACKING REFERENCE SIGNAL PATTERNS," filed May 12, 2021, which was issued as U.S. Pat. No. 11,870,721 and claims the benefit of U.S. Provisional Patent Application No. 63/025,130 by BAI et al., entitled "ENHANCED TRACKING REFERENCE SIGNAL PATTERNS," filed May 14, 2020, each of which is assigned to the assignee hereof, and each of which is expressly incorporated by reference herein.

INTRODUCTION

The following relates to wireless communications and more specifically to managing tracking reference signal (TRS) patterns.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include transmitting, to a base station, a UE capability to receive a first portion of a TRS and a second portion of the TRS, the first portion and the second portion associated with a TRS pattern, receiving, from the base station, an indication of the TRS pattern, where the TRS pattern includes the first portion of the TRS pattern and the second portion of the TRS pattern, where the first portion of the TRS pattern includes a first symbol gap of one or more symbols between TRSs, and the first portion and the second portion of the TRS pattern include a second symbol gap between at least two TRSs, and receiving one or more TRSs according to the first portion of the TRS pattern and the second portion of the TRS pattern.

An apparatus for wireless communications at a UE is described. The apparatus may include a processor and memory coupled to the processor, the memory and processor configured to transmit, to a base station, a UE capability to receive a first portion of a TRS and a second portion of the TRS, the first portion and the second portion associated with a TRS pattern, receive, from the base station, an indication of the TRS pattern, where the TRS pattern includes the first portion of the TRS pattern and the second portion of the TRS pattern, where the first portion of the TRS pattern includes a first symbol gap of one or more symbols between TRSs, and the first portion and the second portion of the TRS pattern include a second symbol gap between at least two TRSs, and receive one or more TRSs according to the first portion of the TRS pattern and the second portion of the TRS pattern.

Another apparatus for wireless communications at a UE is described. The apparatus may include means for transmitting, to a base station, a UE capability to receive a first portion of a TRS and a second portion of the TRS, the first portion and the second portion associated with a TRS pattern, means for receiving, from the base station, an indication of the TRS pattern, where the TRS pattern includes the first portion of the TRS pattern and the second portion of the TRS pattern, where the first portion of the TRS pattern includes a first symbol gap of one or more symbols between TRSs, and the first portion and the second portion of the TRS pattern include a second symbol gap between at least two TRSs, and means for receiving one or more TRSs according to the first portion of the TRS pattern and the second portion of the TRS pattern.

A non-transitory computer-readable medium storing code for wireless communications at a UE is described. The code may include instructions executable by a processor to transmit, to a base station, a UE capability to receive a first portion of a TRS and a second portion of the TRS, the first portion and the second portion associated with a TRS pattern, receive, from the base station, an indication of the TRS pattern, where the TRS pattern includes the first portion of the TRS pattern and the second portion of the TRS pattern, where the first portion of the TRS pattern includes a first symbol gap of one or more symbols between TRSs, and the first portion and the second portion of the TRS pattern include a second symbol gap between at least two TRSs, and receive one or more TRSs according to the first portion of the TRS pattern and the second portion of the TRS pattern.

Some examples of the method, apparatuses, and non-transitory computer-readable medium described herein may further include operations, features, means, or instructions for transmitting a request for the second portion of the TRS pattern to the base station.

Some examples of the method, apparatuses, and non-transitory computer-readable medium described herein may further include operations, features, means, or instructions for detecting the UE may be moving at a speed that satisfies a speed threshold, where the request may be transmitted based on the detecting.

Some examples of the method, apparatuses, and non-transitory computer-readable medium described herein may further include operations, features, means, or instructions for selecting the TRS pattern from a table of patterns based on the indication of the TRS pattern.

Some examples of the method, apparatuses, and non-transitory computer-readable medium described herein may further include operations, features, means, or instructions for receiving a medium access control (MAC) control element (CE) from the base station indicating the table of patterns from a set of multiple tables of patterns.

In some examples of the method, apparatuses, and non-transitory computer-readable medium described herein, the indication of the TRS pattern corresponds an index of the table of patterns.

Some examples of the method, apparatuses, and non-transitory computer-readable medium described herein may further include operations, features, means, or instructions for receiving radio resource control (RRC) signaling from the base station configuring the table of patterns.

In some examples of the method, apparatuses, and non-transitory computer-readable medium described herein, the indication of the TRS pattern may be received via downlink control information (DCI).

In some examples of the method, apparatuses, and non-transitory computer-readable medium described herein, receiving the indication of the TRS pattern may include operations, features, means, or instructions for receiving DCI allocating an aperiodic resource for the set of multiple TRSs.

Some examples of the method, apparatuses, and non-transitory computer-readable medium described herein may further include operations, features, means, or instructions for receiving an indication of a triggering state from the base station via DCI or a MAC-CE, where the TRS pattern may be based on the triggering state.

In some examples of the method, apparatuses, and non-transitory computer-readable medium described herein, a TRS of the second portion of the TRS pattern may be between TRSs of the first portion, before the TRSs of the first portion, or after the TRSs of the first portion.

In some examples of the method, apparatuses, and non-transitory computer-readable medium described herein, the TRS pattern spans a slot or a set of multiple slots.

In some examples of the method, apparatuses, and non-transitory computer-readable medium described herein, the first portion of the TRS pattern spans a TRS bandwidth, and the second portion of the TRS pattern spans a subset of the TRS bandwidth.

Some examples of the method, apparatuses, and non-transitory computer-readable medium described herein may further include operations, features, means, or instructions for performing a time and frequency synchronization based on receiving the one or more TRSs.

A method for wireless communications at a base station is described. The method may include receiving, from a UE, an indication of a UE capability, transmitting, to the UE, an indication of a TRS pattern including a first portion and a second portion for a set of multiple TRSs based on the received indication of the UE capability, where the first portion of the TRS pattern includes a first symbol gap of one or more symbols between TRSs, and the first portion and the second portion of the TRS pattern include a second symbol gap between at least two TRSs, and transmitting the set of multiple TRSs according to the first portion of the TRS pattern and the second portion of the TRS pattern.

An apparatus for wireless communications at a base station is described. The apparatus may include a processor and memory coupled to the processor, the memory and processor configured to receive, from a UE, an indication of a UE capability, transmit, to the UE, an indication of a TRS pattern including a first portion and a second portion for a set of multiple TRSs based on the received indication of the UE capability, where the first portion of the TRS pattern includes a first symbol gap of one or more symbols between TRSs, and the first portion and the second portion of the TRS pattern include a second symbol gap between at least two TRSs, and transmit the set of multiple TRSs according to the first portion of the TRS pattern and the second portion of the TRS pattern.

Another apparatus for wireless communications at a base station is described. The apparatus may include means for receiving, from a UE, an indication of a UE capability, means for transmitting, to the UE, an indication of a TRS pattern including a first portion and a second portion for a set of multiple TRSs based on the received indication of the UE capability, where the first portion of the TRS pattern includes a first symbol gap of one or more symbols between TRSs, and the first portion and the second portion of the TRS pattern include a second symbol gap between at least two TRSs, and means for transmitting the set of multiple TRSs according to the first portion of the TRS pattern and the second portion of the TRS pattern.

A non-transitory computer-readable medium storing code for wireless communications at a base station is described. The code may include instructions executable by a processor to receive, from a UE, an indication of a UE capability, transmit, to the UE, an indication of a TRS pattern including a first portion and a second portion for a set of multiple TRSs based on the received indication of the UE capability, where the first portion of the TRS pattern includes a first symbol gap of one or more symbols between TRSs, and the first portion and the second portion of the TRS pattern include a second symbol gap between at least two TRSs, and transmit the set of multiple TRSs according to the first portion of the TRS pattern and the second portion of the TRS pattern.

Some examples of the method, apparatuses, and non-transitory computer-readable medium described herein may further include operations, features, means, or instructions for receiving a request for the second portion of the TRS pattern from the UE based on a high speed of the UE.

In some examples of the method, apparatuses, and non-transitory computer-readable medium described herein, the indication of the TRS pattern corresponds to an index of a table of patterns configured at the UE.

Some examples of the method, apparatuses, and non-transitory computer-readable medium described herein may further include operations, features, means, or instructions for transmitting a MAC-CE, to the UE indicating the table of patterns from a set of multiple tables of patterns.

Some examples of the method, apparatuses, and non-transitory computer-readable medium described herein may further include operations, features, means, or instructions for transmitting RRC signaling to the UE configuring the table of patterns.

In some examples of the method, apparatuses, and non-transitory computer-readable medium described herein, the indication of the TRS pattern may be transmitted via DCI.

In some examples of the method, apparatuses, and non-transitory computer-readable medium described herein, transmitting the indication of the TRS pattern may include operations, features, means, or instructions for transmitting DCI allocating an aperiodic resource for the set of multiple TRSs.

Some examples of the method, apparatuses, and non-transitory computer-readable medium described herein may further include operations, features, means, or instructions for transmitting an indication of a triggering state from the base station via DCI or a MAC-CE, where the TRS pattern may be based on the triggering state.

In some examples of the method, apparatuses, and non-transitory computer-readable medium described herein, a TRS of the second portion of the TRS pattern may be between TRSs of the first portion, before the TRSs of the first portion, or after the TRSs of the first portion.

In some examples of the method, apparatuses, and non-transitory computer-readable medium described herein, the first portion of the TRS pattern spans a TRS bandwidth, and the second portion of the TRS pattern spans a subset of the TRS bandwidth.

Some examples of the method, apparatuses, and non-transitory computer-readable medium described herein may further include operations, features, means, or instructions for transmitting the indication of the TRS pattern to a second UE that may be incapable of receiving the second portion of the TRS pattern and scheduling a downlink shared channel resource for the second UE, where the downlink shared channel resource at least partially overlaps with the second portion of the TRS in time, frequency, antenna port, or any combination thereof, based on a modulation and coding scheme of the second UE being low.

Some examples of the method, apparatuses, and non-transitory computer-readable medium described herein may further include operations, features, means, or instructions for scheduling a second UE for a downlink shared channel during a slot including the set of multiple TRSs, where the second UE may be incapable of receiving the second portion of the TRS pattern and transmitting the indication of the TRS pattern to the second UE, where the indication configures the second UE for a zero-power channel state information reference signal during the second portion of the TRS pattern.

A method for wireless communications at a UE is described. The method may include transmitting, to a base station, a UE capability to receive a first portion of a TRS and a second portion of the TRS, the first portion and the second portion associated with a TRS pattern, receiving, from the base station, an indication of the TRS pattern, where the TRS pattern includes the first portion of the TRS pattern and the second portion of the TRS pattern and monitoring for a set of TRS according to the first portion of the TRS pattern and the second portion of the TRS pattern.

An apparatus for wireless communications at a UE is described. The apparatus may include a processor and memory coupled to the processor. The processor and memory being configured to transmit, to a base station, a UE capability to receive a first portion of a TRS and a second portion of the TRS, the first portion and the second portion associated with a TRS pattern. The processor and memory may be further configured to receive, from the base station, an indication of the TRS pattern, where the TRS pattern includes the first portion of the TRS pattern and the second portion of the TRS pattern. In addition, the processor and memory may be configured to monitor for a set of TRS according to the first portion of the TRS pattern and the second portion of the TRS pattern.

Another apparatus for wireless communications at a UE is described. The apparatus may include means for transmitting, to a base station, a UE capability to receive a first portion of a TRS and a second portion of the TRS, the first portion and the second portion associated with a TRS pattern, means for receiving, from the base station, an indication of the TRS pattern, where the TRS pattern includes the first portion of the TRS pattern and the second portion of the TRS pattern, and means for monitoring for a set of TRS according to the first portion of the TRS pattern and the second portion of the TRS pattern.

A non-transitory computer-readable medium storing code for wireless communications at a UE is described. The code may include instructions executable by a processor to transmit, to a base station, a UE capability to receive a first portion of a TRS and a second portion of the TRS, the first portion and the second portion associated with a TRS pattern, receive, from the base station, an indication of the TRS pattern, where the TRS pattern includes the first portion of the TRS pattern and the second portion of the TRS pattern, and monitor for a set of TRS according to the first portion of the TRS pattern and the second portion of the TRS pattern.

Some examples of the method, apparatuses, and non-transitory computer-readable medium described herein may further include operations, features, means, or instructions for transmitting a request for the second portion of the TRS pattern to the base station.

Some examples of the method, apparatuses, and non-transitory computer-readable medium described herein may further include operations, features, means, or instructions for detecting the UE may be moving at a speed that satisfies a speed threshold, where the request may be transmitted based on the detecting.

Some examples of the method, apparatuses, and non-transitory computer-readable medium described herein may further include operations, features, means, or instructions for selecting the TRS pattern from a table of patterns based on the indication of the TRS pattern.

Some examples of the method, apparatuses, and non-transitory computer-readable medium described herein may further include operations, features, means, or instructions for receiving a MAC-CE from the base station indicating the table of patterns from a set of tables of patterns.

In some examples of the method, apparatuses, and non-transitory computer-readable medium described herein, the indication of the TRS pattern corresponds an index of the table of patterns.

Some examples of the method, apparatuses, and non-transitory computer-readable medium described herein may further include operations, features, means, or instructions for receiving RRC signaling from the base station configuring the table of patterns.

In some examples of the method, apparatuses, and non-transitory computer-readable medium described herein, the indication of the TRS pattern may be received via DCI.

In some examples of the method, apparatuses, and non-transitory computer-readable medium described herein, receiving the indication of the TRS pattern may include operations, features, means, or instructions for receiving DCI allocating an aperiodic resource for the set of TRS.

Some examples of the method, apparatuses, and non-transitory computer-readable medium described herein may further include operations, features, means, or instructions for receiving an indication of a triggering state from the base station via DCI or a MAC-CE, where the TRS pattern may be based on the triggering state.

In some examples of the method, apparatuses, and non-transitory computer-readable medium described herein, the first portion of the TRS pattern includes a four symbol gap between TRS, and the first portion and the second portion of the TRS pattern include a smaller symbol gap (e.g., fewer symbols than a four symbol gap) between at least two TRS.

In some examples of the method, apparatuses, and non-transitory computer-readable medium described herein, a TRS of the second portion of the TRS pattern may be between TRS of the first portion, before the TRS of the first portion, or after the TRS of the first portion.

In some examples of the method, apparatuses, and non-transitory computer-readable medium described herein, the TRS pattern spans a slot or a set of slots.

In some examples of the method, apparatuses, and non-transitory computer-readable medium described herein, the first portion of the TRS pattern spans a TRS bandwidth, and the second portion of the TRS pattern spans a subset of the TRS bandwidth.

A method for wireless communications at a base station is described. The method may include receiving, from a UE, a UE capability to receive a first portion of a TRS and a second portion of a TRS, the first portion and the second portion associated with a TRS pattern, selecting the TRS pattern including the first portion and the second portion for a set of TRS based on receiving the UE capability, transmitting, to the UE, an indication of the TRS pattern, and transmitting the set of TRS according to the first portion of the TRS pattern and the second portion of the TRS pattern.

An apparatus for wireless communications at a base station is described. The apparatus may include a processor and memory coupled to the processor. The processor and memory may be configured to receive, from a UE, a UE capability to receive a first portion of a TRS and a second portion of a TRS. The first portion and the second portion may be associated with a TRS pattern. The processor and memory may be further configured to select the TRS pattern including the first portion and the second portion for a set of TRS based on receiving the UE capability. The processor and memory may be further configured to transmit, to the UE, an indication of the TRS pattern. In addition, the processor and memory may be configured to transmit the set of TRS according to the first portion of the TRS pattern and the second portion of the TRS pattern.

Another apparatus for wireless communications at a base station is described. The apparatus may include means for receiving, from a UE, a UE capability to receive a first portion of a TRS and a second portion of a TRS, the first portion and the second portion associated with a TRS pattern, means for selecting the TRS pattern including the first portion and the second portion for a set of TRS based on receiving the UE capability, means for transmitting, to the UE, an indication of the TRS pattern, and means for transmitting the set of TRS according to the first portion of the TRS pattern and the second portion of the TRS pattern.

A non-transitory computer-readable medium storing code for wireless communications at a base station is described. The code may include instructions executable by a processor to receive, from a UE, a UE capability to receive a first portion of a TRS and a second portion of a TRS, the first portion and the second portion associated with a TRS pattern, select the TRS pattern including the first portion and the second portion for a set of TRS based on receiving the UE capability, transmit, to the UE, an indication of the TRS pattern, and transmit the set of TRS according to the first portion of the TRS pattern and the second portion of the TRS pattern.

Some examples of the method, apparatuses, and non-transitory computer-readable medium described herein may further include operations, features, means, or instructions for receiving a request for the second portion of the TRS pattern from the UE based on a high speed of the UE.

In some examples of the method, apparatuses, and non-transitory computer-readable medium described herein, the indication of the TRS pattern corresponds to an index of a table of patterns configured at the UE.

Some examples of the method, apparatuses, and non-transitory computer-readable medium described herein may further include operations, features, means, or instructions for transmitting a MAC-CE to the UE indicating the table of patterns from a set of tables of patterns.

Some examples of the method, apparatuses, and non-transitory computer-readable medium described herein may further include operations, features, means, or instructions for transmitting RRC signaling to the UE configuring the table of patterns.

In some examples of the method, apparatuses, and non-transitory computer-readable medium described herein, the indication of the TRS pattern may be transmitted via DCI.

In some examples of the method, apparatuses, and non-transitory computer-readable medium described herein, transmitting the indication of the TRS pattern may include operations, features, means, or instructions for transmitting DCI allocating an aperiodic resource for the set of TRS.

Some examples of the method, apparatuses, and non-transitory computer-readable medium described herein may further include operations, features, means, or instructions for transmitting an indication of a triggering state from the base station via DCI or a MAC-CE, where the TRS pattern may be based on the triggering state.

In some examples of the method, apparatuses, and non-transitory computer-readable medium described herein, the first portion of the TRS pattern includes a four symbol gap between TRS, and the first portion and the second portion of the TRS pattern include a two symbol gap between at least two TRS.

In some examples of the method, apparatuses, and non-transitory computer-readable medium described herein, a TRS of the second portion of the TRS pattern may be between TRS of the first portion, before the TRS of the first portion, or after the TRS of the first portion.

In some examples of the method, apparatuses, and non-transitory computer-readable medium described herein, the TRS pattern spans a slot or a set of slots.

In some examples of the method, apparatuses, and non-transitory computer-readable medium described herein, the first portion of the TRS pattern spans a TRS bandwidth, and the second portion of the TRS pattern spans a subset of the TRS bandwidth.

Some examples of the method, apparatuses, and non-transitory computer-readable medium described herein may further include operations, features, means, or instructions for transmitting the indication of the TRS pattern to a second UE that may be incapable of receiving the second portion of the TRS pattern, and scheduling a downlink shared channel resource for the second UE, where the downlink shared channel resource at least partially overlaps with the second portion of the TRS in time, frequency, antenna port, or any combination thereof, based on a modulation and coding scheme of the second UE being low.

Some examples of the method, apparatuses, and non-transitory computer-readable medium described herein may further include operations, features, means, or instructions for scheduling a second UE for a downlink shared channel during a slot including the set of TRS, where the second UE may be incapable of receiving the second portion of the TRS pattern, and transmitting the indication of the TRS pattern to the second UE, where the indication configures the second UE for a zero-power channel state information reference signal during the second portion of the TRS pattern.

DETAILED DESCRIPTION

Figure 1:
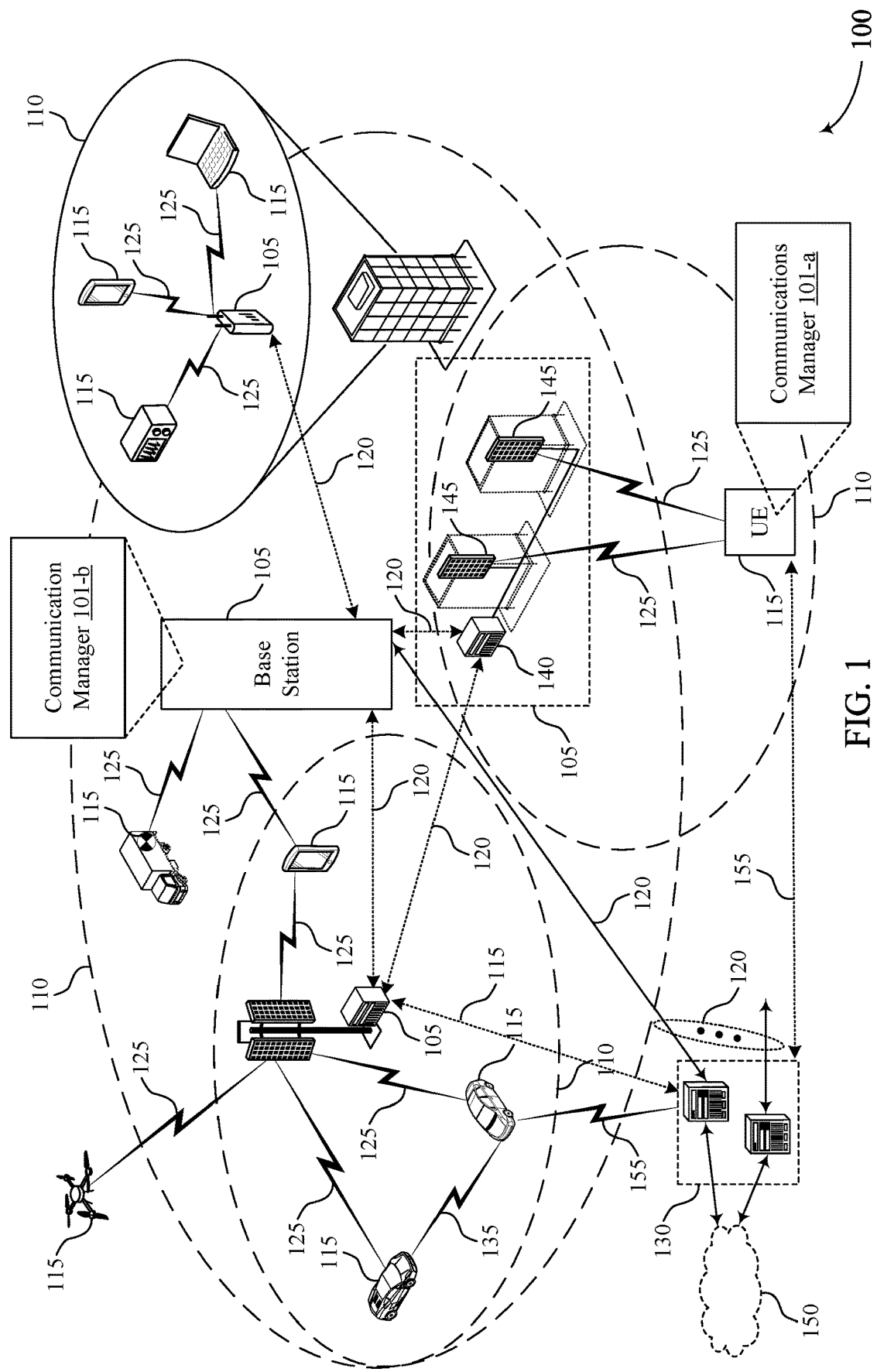
FIG. 1 illustrates an example of a system for wireless communications that supports enhanced TRS patterns in accordance with aspects of the present disclosure.

Some wireless communications systems support a TRS for fine time and frequency tracking of UE. For example, a UE may receive one or more TRSs transmitted by a base station, and the UE may track frequency and time variations with a high resolution when communicating with the base station based on the received TRS. A TRS may be configured on a channel state information reference signal (CSI-RS) resource set. In some examples, a TRS may be configured on a UE-specific basis. In some examples, multiple UEs may be configured to share a TRS. In some examples, TRSs may be transmitted according to a pattern. For example, in some wireless communications systems, a set of TRSs may be transmitted with a four symbol gap between the TRSs in a slot according to the TRS pattern. For example, a TRS pattern of some other wireless communications may use a TRS pattern with two TRSs, where a first TRS is transmitted in symbol period 4 and a second TRS is transmitted in symbol period 8. A UE may search for the TRS within a pull-in signal range, where the UE can detect a signal as long as the signal is within the pull-in signal range of the originally allocated frequency. The pull-in signal range may be a distance from a transmitting device, where receiving devices within the distance of the pull-in signal range may be able to coherently decode a signal from the transmitting device. The pull-in signal range may compensate for effects such as doppler shift, which may affect a frequency of a transmission in relation to movement of the UE. If the UE detects the TRS, the UE may use the TRS to perform time and frequency tracking, such as performing central frequency offset estimation.

Some wireless communications using a TRS may also support wireless communications with high speed devices. For example, a wireless communications network may provide service for a UE on a high speed train. When a UE is in a high speed scenario, a maximum doppler shift may be close to, or exceed, a pull-in range for carrier frequency offset estimation. The maximum pull-in range for carrier frequency offset estimation of TRS may be based on the interval between TRS symbols. For example, for TRS patterns used by some systems, the maximum pull-in range may be very close to the maximum doppler shift of a UE on a high speed train. This may lead to some situations where a UE on a high speed train cannot acquire the TRS to perform carrier frequency offset estimation, and the UE and serving cell cannot reliably perform the fine time/frequency tracking.

A UE and a base station described herein may implement techniques to configure the UE with an enhanced TRS pattern, where more TRSs are transmitted in a given time period. With the enhanced TRS pattern, there may be, for example, just one symbol period between TRS transmissions, which may provide a larger pull-in range. For example, instead of a TRS symbol interval of four symbols, additional TRS may be transmitted such that the TRS symbol interval is reduced to two symbols. This may approximately double the pull-in range for the UE, preventing the doppler shift from exceeding the maximum pull-in range and enabling the UE to reliably acquire the TRS and perform fine time and frequency tracking. The enhanced TRS pattern may be backward-compatible with other systems. For example, the enhanced TRS pattern may include a first portion of TRS and a second portion of TRS. The first portion of TRS may be the TRS pattern of other systems, and the second portion may include additional TRS to provide a smaller symbol interval between transmissions of each TRS. This may enable both UEs having the capability and UEs not having the capability to still use the same TRS, as UEs on the same train may likely be offered the same TRS. A UE may indicate its capability to support the second portion of the TRS pattern, and the base station may configure the UE for the TRS pattern with the first portion and second portion based on the UE capability. These techniques may enable a UE to perform time and frequency synchronization using one or more TRSs in a high speed scenario. These techniques may provide for higher quality communications links between a UE in a high speed scenario (e.g., on a high speed train) and serving cells.

Aspects of the disclosure are initially described in the context of wireless communications systems. Aspects of the disclosure are further illustrated by and described with reference to apparatus diagrams, system diagrams, and flowcharts that relate to enhanced TRS patterns.

FIG. 1 illustrates an example of a wireless communications system 100 that supports enhanced TRS patterns in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. In some cases, a UE 115 may communicate with the core network 130 through communication link 155.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to increase link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may provide higher throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support a TRS for fine time and frequency tracking of a UE 115. Some wireless communications systems may not support a CRS. In some cases, TRS may be transmitted on a wide-band and in regular bursts. The parameters for a burst structure may include a TRS burst length in terms of a number of slots and the TRS burst periodicity in terms of a number of slots.

A TRS may be configured on a CSI-RS resource set. For example, some common values for non-zero power CSI-RS in the CSI-RS resource set may be configured for TRS to reduce signaling overhead. TRSs may be UE-specifically managed and configured on a UE-specific basis, though multiple UEs 115 may be configured to share a TRS. Demodulation reference signal (DMRS) and TRS may be time division multiplexed from a UE 115 perspective. TRSs may be configured on a carrier or on an active bandwidth part when a synchronization signal block is not present. A TRS may be quasi co-located with a downlink shared channel DMRS, at least for delay spread, average delay, doppler shift, and doppler spread. A TRS sequence may be based on a pseudorandom noise generator, which may be similar to CSI-RS. For a connected mode UE 115, the UE 115 may be expected to receive UE-specific configuration of TRS for sub-6 GHz communications and above-6 GHz communications.

In some examples, TRSs may be transmitted according to a pattern. For example, in some wireless communications systems, a set of TRSs may be transmitted with a four symbol gap between the TRSs in a slot according to the TRS pattern.

The UE 115 may search for the TRSs within a pull-in signal range. If the UE 115 detects the TRSs, the UE 115 may use the TRSs to perform the fine time and frequency tracking. In some examples, the maximum pull in range, |f|, may be determined based on the interval between TRS symbols according to $N*Ts*pi*|f|<pi$, where N is the gap between symbol periods and Ts is the symbol duration. For a TRS pattern with a four symbol period interval between TRSs, the pull-in range for a 120 kHz subcarrier spacing may be 14 kHz.

Some wireless communications using a TRS may also support wireless communications with high speed devices. For example, a wireless communications network may provide service for a UE 115 on a high speed train, vehicle, etc. When a UE 115 is in a high speed scenario, a maximum doppler shift may be close to, or exceed, a pull-in range for carrier frequency offset estimation. A doppler shift for a UE 115 on a high speed train may be as high as, for example 13.9 kHz. Therefore, for TRS patterns used by some systems, the maximum pull-in range may be very close to the maximum doppler shift of a UE 115 on a high speed train. This may lead to some situations where a UE 115 on a high speed train cannot acquire the TRS to perform carrier frequency offset estimation, and the UE 115 and serving cell cannot reliably perform the fine time/frequency tracking. Additionally, communicating at a high carrier frequency may increase the doppler shift. For example, the open loop frequency synchronization in some radio frequency components may be difficult to achieve at high frequencies.

A UE 115 described herein may be configured with an enhanced TRS pattern, where more TRSs are transmitted in a given time period. With the enhanced TRS pattern, there may be a smaller interval between TRS transmissions, which may provide a larger pull-in range or a pull-in range with a greater distance. For example, instead of a TRS symbol interval of four symbols, additional TRS may be transmitted such that the TRS symbol interval is reduced to two symbols. This may double the pull-in range for the UE 115, preventing the doppler shift from exceeding the maximum pull-in range and enabling the UE 115 to reliably acquire the TRS and perform fine time and frequency tracking. The enhanced TRS pattern may be backward-compatible with other systems. For example, the enhanced TRS pattern may include a first portion of TRS and a second portion of TRS. The first portion of TRS may be the TRS pattern of other systems, and the second portion may include additional TRS to provide a smaller symbol interval between transmissions of each TRS. This may enable both capable and incapable UEs 115 to still use the same TRS, as UEs 115 on the same train may likely be offered the same TRS. A UE 115 may indicate its capability to support the second portion of the TRS pattern, and the base station may configure the UE 115 for the TRS pattern with the first portion and second portion based on the UE capability.

In various examples, a communication manager 101 may be included in a device to support enhanced TRS patterns with a higher density of TRSs in a TRS pattern. For example, a UE 115 may include a communications manager 101-*a*, or a base station may include a communications manager 110-*b*.

In some examples, a communication manager 101 may transmit, to a base station 105, a UE capability to receive a first portion of a TRS and a second portion of the TRS, the first portion and the second portion associated with a TRS pattern. The communication manager 101 may receive, from the base station 105, an indication of the TRS pattern. In some cases, the TRS pattern may include the first portion of the TRS pattern and the second portion of the TRS pattern. The communication manager 101 may monitor for a set of TRS according to the first portion of the TRS pattern and the second portion of the TRS pattern.

In some examples, a communication manager 101 may receive, from a UE 115, a UE capability to receive a first portion of a TRS and a second portion of a TRS, the first portion and the second portion associated with a TRS pattern. The communication manager 101 may select the TRS pattern including the first portion and the second portion for a set of TRS based on receiving the UE capability. The communication manager 101 may transmit, to the UE 115, an indication of the TRS pattern. The communication manager 101 may transmit the set of TRS according to the first portion of the TRS pattern and the second portion of the TRS pattern.

In some examples, a communication manager 101 may transmit, to a base station 105, a UE capability to receive a first portion of a TRS and a second portion of the TRS, the first portion and the second portion associated with a TRS pattern. The communication manager 101 may receive, from the base station 105, an indication of the TRS pattern. In some cases, the TRS pattern may include the first portion of the TRS pattern and the second portion of the TRS pattern. In some cases, the first portion of the TRS pattern includes a first symbol gap of one or more symbols between TRSs, and the first portion and the second portion of the TRS pattern include a second symbol gap (e.g., of at least one symbol) between at least two TRSs. The communication manager 101 may receive one or more TRSs according to the first portion of the TRS pattern and the second portion of the TRS pattern.

In some examples, a communication manager 101 may receive, from a UE 115, an indication of a UE capability. The communication manager 101 may transmit, to the UE, an indication of a TRS pattern including a first portion and a second portion for a set of one or more of TRSs based on the received indication of the UE capability. In some cases, the first portion of the TRS pattern includes a first symbol gap of one or more symbols between TRSs, and the first portion and the second portion of the TRS pattern include a second symbol gap between at least two TRSs. The communication manager 101 may transmit the set of TRS according to the first portion of the TRS pattern and the second portion of the TRS pattern.

Figure 2:
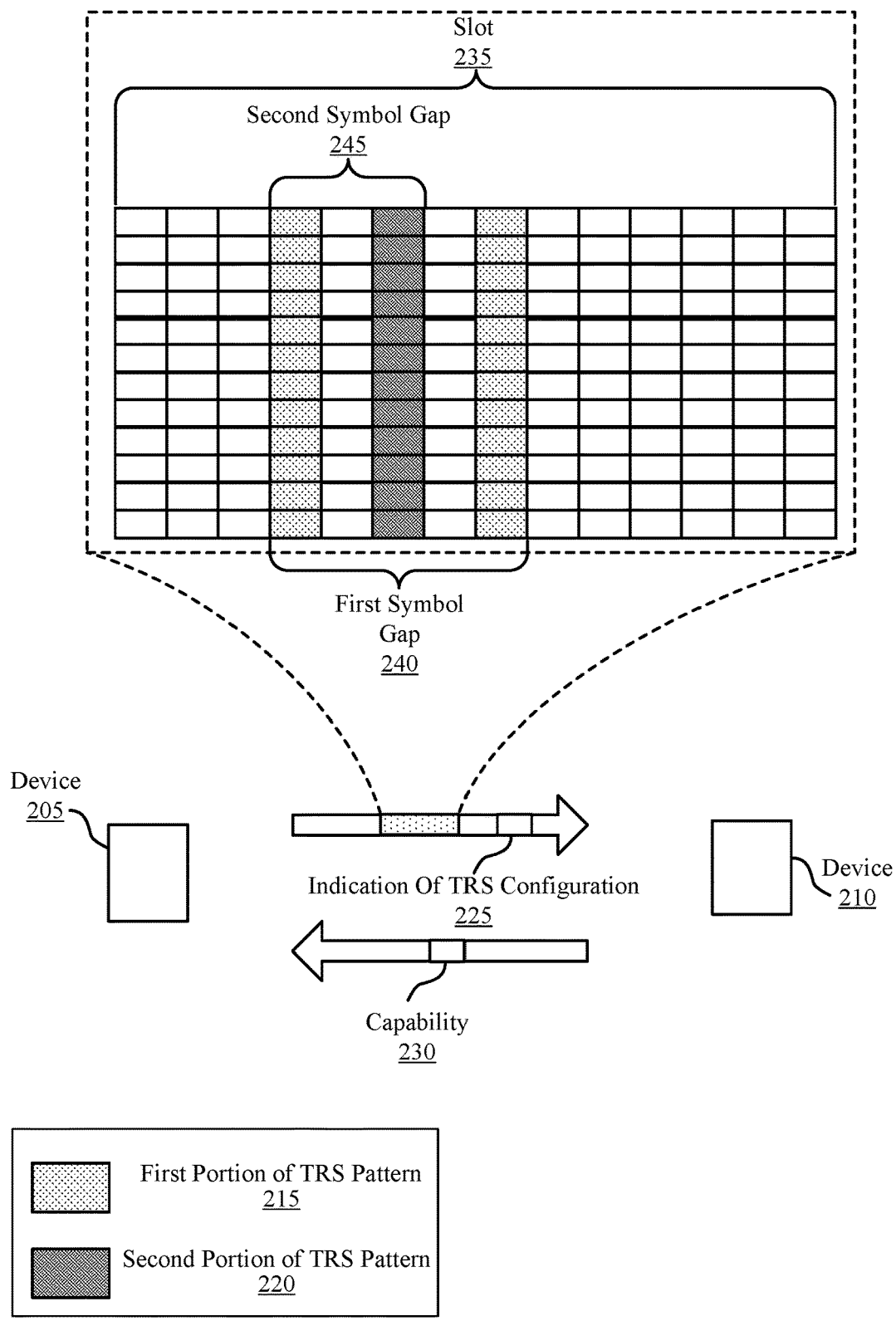
FIG. 2 illustrates an example of a wireless communications system that supports enhanced TRS patterns in accordance with aspects of the present disclosure.

FIG. 2 illustrates an example of a wireless communications system 200 that supports enhanced TRS patterns in accordance with aspects of the present disclosure. In some examples, wireless communications system 200 may implement aspects of wireless communication system 100.

The wireless communications system 200 may include a device 205 (e.g., a TRS transmitter) and a device 210 (e.g., a TRS receiver), where the device 205 and the device 210 may refer to various types of devices according to different types of configurations. For example, when the described reference signals are associated with downlink transmission, the device 205 may be a base station 105 and the second device 210 may be a UE 115. For example, the device 205 may be an example of a base station 105 described with reference to FIG. 1, and the device 210 may be an example of a UE 115 described with reference to FIG. 1.

The wireless communications system 200 may support TRS schemes for fine time and frequency tracking of devices such as a device 210. A TRS may be configured on a CSI-RS resource set and configured on a device-specific basis, though multiple devices 210 may be configured to share a TRS. In some examples, TRS may be transmitted according to a pattern. For example, in some wireless communications systems, the device 205 may transmit a set of TRSs including one or more TRSs according to a TRS pattern with a four symbol gap between the TRS in a slot. The device 210 may search for the TRS within a pull-in signal range. If the device 210 detects the TRS, the device 210 may use the TRS to perform the time and frequency tracking.

The wireless communications system 200 may support wireless communications with high speed devices. For example, the device 210 may be on a high speed train, and the device 205 may provide service for the device 210. In some cases, the maximum pull-in range for carrier frequency offset estimation of TRS may be based on the interval between TRS symbols. When the device 210 is in a high speed scenario, a maximum doppler shift may be close to, or exceed, a pull-in range for carrier frequency offset estimation. For example, for TRS patterns used by some other systems, the maximum pull-in range may be very close to the maximum doppler shift of a wireless device on a high speed train. This may lead to some situations where a wireless device on a high speed train cannot acquire the TRS to perform carrier frequency offset estimation, and the wireless device and serving cell cannot reliably perform the fine time and frequency tracking.

Devices described herein, such as the device 210, may be configured with an enhanced TRS pattern, where more TRSs are transmitted in a given time period. With the enhanced TRS pattern, there may be a smaller interval between TRS transmissions, which may provide a larger pull-in range. For example, instead of a TRS symbol interval of four symbols, additional TRS may be transmitted such that the TRS symbol interval is reduced to two symbols. This may approximately double the pull-in range for the device 210, preventing the doppler shift from exceeding the maximum pull-in range and enabling the device 210 to reliably acquire the TRS and perform fine time and frequency tracking.

The enhanced TRS pattern may be backward-compatible with TRS patterns of other systems. For example, the enhanced TRS pattern may include a first portion of a TRS pattern 215 and a second portion of a TRS pattern 220. The first portion of the TRS pattern 215 may correspond to the TRS pattern of other systems, and the second portion of the TRS pattern 220 may include additional TRS to provide a smaller symbol interval between transmissions of each TRS. This may enable both capable and incapable devices to still use the same TRS, as devices on the same train may likely be offered the same TRS. Techniques described herein, such as the enhanced TRS pattern, may be applied for devices in high speed scenarios, for devices with high mobility, with UEs 115 operating at on high frequency carriers, or any combination thereof.

The device 210 may indicate a capability 230 to the device 205, the capability indicating support for second portion of the TRS pattern 220. The device 205 may transmit an indication of a TRS configuration 225 to the device 210 indicating a TRS pattern with the first portion of the TRS pattern 215 and the second portion of the TRS pattern 220 based on receiving the capability 230. The device 205 may indicate a pattern selection via RRC signaling or a MAC control element (CE). For example, the device 210 may have two pattern tables, corresponding to TRS patterns without the second portion and TRS patterns with the second portion. Based on a MAC-CE, the device 210 may select a table to use. The device 205 may transmit DCI to indicate an index of the selected table corresponding to a TRS pattern.

The TRS pattern with the first and second portions may have a shorter time interval between TRS transmissions than just the first portion of the TRS pattern 215. In some cases, the second portion of the TRS pattern 220 may span the same slot as the first portion of the TRS pattern (e.g., a slot 235), or the second portion of the TRS pattern 220 may span multiple slots. For example, there may be a first symbol gap 240 between TRSs transmitted according to the first portion of the TRS pattern 215. For example, there may be three symbols between a first TRS transmitted according to the first pattern and a second TRS transmitted according to the first pattern. For example, TRS may be transmitted in symbol periods 3 and 7 when using just the first portion of the TRS pattern 215. The second portion of the TRS pattern 220, with the first portion of the TRS pattern 215, may reduce a size of the symbol gaps between the TRSs. For example, there may be a second symbol gap 245 between TRSs when using both the first portion of the TRS pattern 215 and the second portion of the TRS pattern 220. For example, TRS may be transmitted in symbols 3, 5, and 7 with both portions of the TRS pattern, where the second symbol gap 245 may be one symbol.

In some examples, the device 210 may transmit a request for the second portion of the TRS pattern 220. For example, the device 210 may detect a high speed, and the device 210 may transmit the request, or a recommendation, based on detecting the high speed. In some cases, a table configured for the device 210 may be reselected (e.g., via MAC-CE) based on the speed of the device 210.

In some examples, the device 210 may be configured for an aperiodic TRS. For an aperiodic TRS, a triggering DCI may indicate the TRS pattern. A TRS resource set of the TRS pattern may be configured in an aperiodic triggering state. DCI, a MAC-CE, or both, may indicate the triggering state corresponding to the TRS pattern from the list of trigger states. A field in the DCI may indicate whether an enhanced TRS pattern is chosen for the aperiodic TRS. In some cases, the field may be an example of a new field of a previous type of DCI, or the field may be an example of an unused field from the previous type of DCI.

By implementing these techniques, the device 210 may reliably acquire TRS and perform time and frequency tracking. Even in high speed scenarios, the pull-in range for TRS transmitted according to a TRS pattern with the second portion may be higher than a doppler spread of the TRS, and the TRS may be acquired by the device 210.

Figure 3:
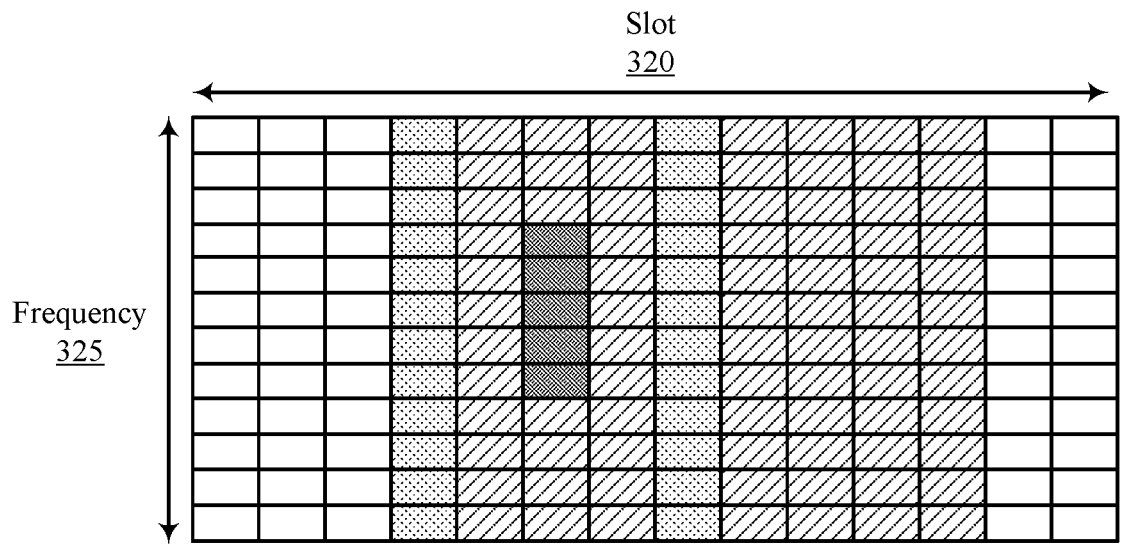
FIG. 3 illustrates an example of a TRS pattern configuration that supports enhanced TRS patterns in accordance with aspects of the present disclosure.
Figure 3:
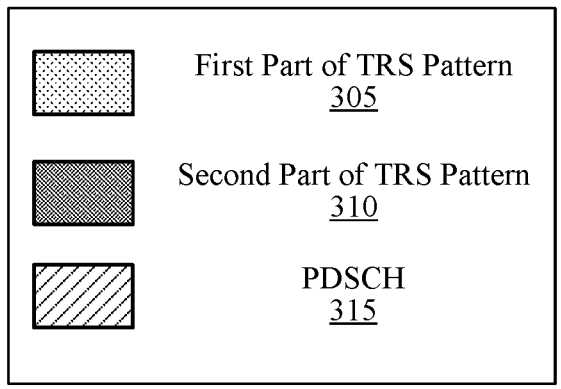

FIG. 3 illustrates an example of a TRS pattern configuration 300 that supports enhanced TRS patterns in accordance with aspects of the present disclosure. In some examples, the TRS pattern configuration 300 may implement aspects of wireless communication system 100.

A base station 105 may transmit TRS according to a TRS pattern to a UE 115. The UE 115 may acquire the TRS and perform time and frequency tracking based on the TRS. The techniques described herein support an enhanced TRS pattern with higher density TRS, which may increase a pull-in range for the TRS. By increasing the pull-in range, a UE 115 traveling at a high speed may reliably acquire the TRS, even if the high speed scenario increases a doppler spread of the TRS.

The enhanced TRS pattern may include a first portion 305 of TRS and a second portion 310 of TRS. The first portion 305 of TRS may correspond to a TRS pattern used in other systems. By also transmitting the second portion 310 of TRS, a base station 105 may transmit TRSs with higher density within a time period. The first portion 305 of TRS may span a slot 320. The second portion 310 may span the slot 320 or multiple slots.

A TRS may be shared by multiple UEs 115. In some cases, sharing the TRS may be transparent to the UEs 115. The TRS may be configured per-UE 115, and the configuration may not explicitly indicate the TRS is shared with other UEs 115. If, for example, multiple UEs 115 are in a same train, the UEs 115 may be configured to use the same TRS. Configuring multiple UEs 115 for the same TRS may reduce system overhead compared to transmitting individual TRS for UEs 115.

In some examples, a base station 105 may configure at least two UEs 115 to share a TRS, where a first UE 115 may be capable of the enhanced TRS pattern and a second UE 115 may be incapable of the enhanced TRS pattern. In some examples, the base station 105 may transmit a TRS pattern with both the first portion 305 of TRS and the second portion 310 of TRS to increase the pull-in range for the first UE 115. The second UE 115 may be scheduled for downlink shared channel resources 315 in a slot including the TRS. However, the second UE 115 may not be capable of receiving the second portion 310 of TRS. The base station 105 may implement techniques to avoid introducing errors for the second UE 115 when transmitting TRS according to the enhanced TRS pattern.

In some cases, the base station 105 may schedule a CSI-RS for the second UE 115 at the resources corresponding to the second portion 310 of TRS. In some cases, the base station 105 may schedule the second UE for a zero power CSI-RS. The second UE 115 may then rate match around resources with the second portion 310 of TRS.

In some cases, the base station 105 may configure the second portion 310 of TRS to be transmitted on a subset of a TRS bandwidth. In some cases, a TRS may be transmitted on up to 50 resource blocks. The first portion 305 of TRS may be transmitted on a first bandwidth (e.g., the full 50 resource blocks) of frequency 325, and the second portion 310 of TRS may be transmitted on a subset of the first bandwidth. Based on the second portion 310 of TRS being transmitted on the smaller bandwidth, the downlink shared channel resources 315 for the second UE 115 may be scheduled to not overlap with the second portion 310 of TRS.

In some cases, the base station 105 may determine that a downlink shared channel modulation and coding scheme (MCS) for the second UE 115 is very low. If the MCS of the second UE 115 is low, the base station 105 may not adjust scheduling of the second UE 115 or the enhanced TRS pattern. For example, if the MCS is low, then the second UE 115 may still be able to successfully decode a physical downlink shared channel (PDSCH). In some example, the base station 105 may avoid scheduling the enhanced TRS pattern and downlink shared channel resources 315 for UEs 115 which do not support the enhanced TRS pattern in the same slot and port.

Figure 4:
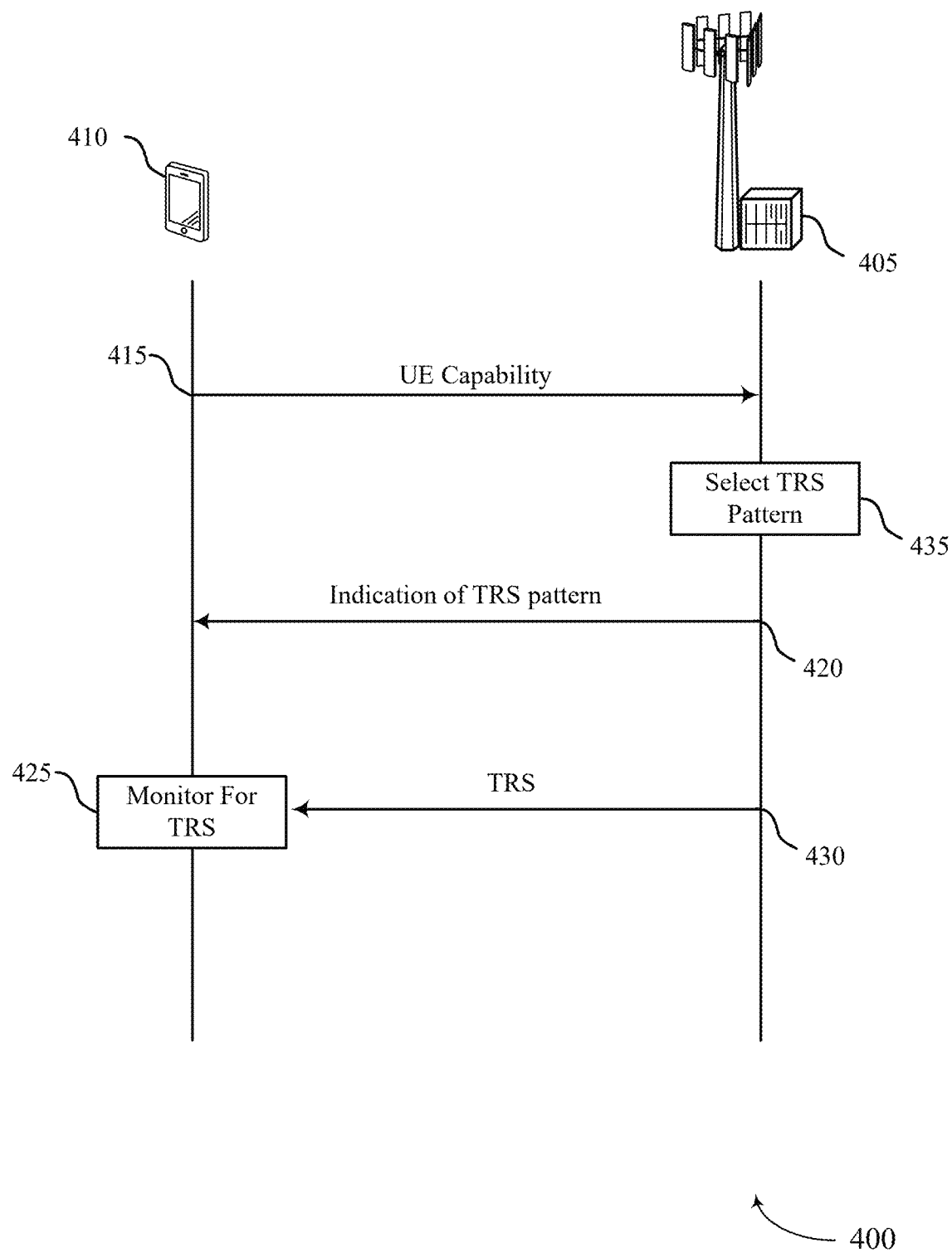
FIG. 4 illustrates an example of a process flow that supports enhanced TRS patterns in accordance with aspects of the present disclosure.

FIG. 4 illustrates an example of a process flow 400 that supports enhanced TRS patterns in accordance with aspects of the present disclosure. In some examples, process flow 400 may implement aspects of wireless communication system 100.

The process flow 400 may be implemented by a UE 115 or a base station 105, or both. For example, the process flow 400 may be implemented by a base station 405, a UE 410, or both, which may be respective examples of a base station 105 and a UE 115.

The UE 410 may be an example of a capable device for receiving an enhanced TRS pattern. The enhanced TRS pattern may have additional TRS and shorter symbol period intervals between TRS transmissions. At 415, UE 410 may transmit, to base station 405, a UE capability to receive a first portion of a TRS and a second portion of the TRS. The first portion and the second portion may be associated with a TRS pattern, such as an enhanced TRS pattern described herein.

At 435, base station 405 may select a TRS pattern including the first portion and the second portion for a set of TRSs based on receiving the UE capability. Base station 405 may transmit an indication of the TRS pattern to UE 410 at 420. In some cases, the indication is transmitted via DCI. For example, UE 410 may be configured with TRS patterns, or tables of TRS patterns, via RRC signaling or a MAC-CE, and the DCI may indicate a TRS pattern corresponding to an index of one of the tables.

At 425, UE 410 may monitor for the set of TRS according to the first portion of the TRS pattern and the second portion of the TRS pattern. At 430, base station 405 may transmit the set of TRS according to the first portion of the TRS pattern and the second portion of the TRS pattern. The UE 410 may receive the TRS of the first portion and the second portion and perform, for example, carrier frequency offset estimation for time and frequency tracking.

Figure 5:
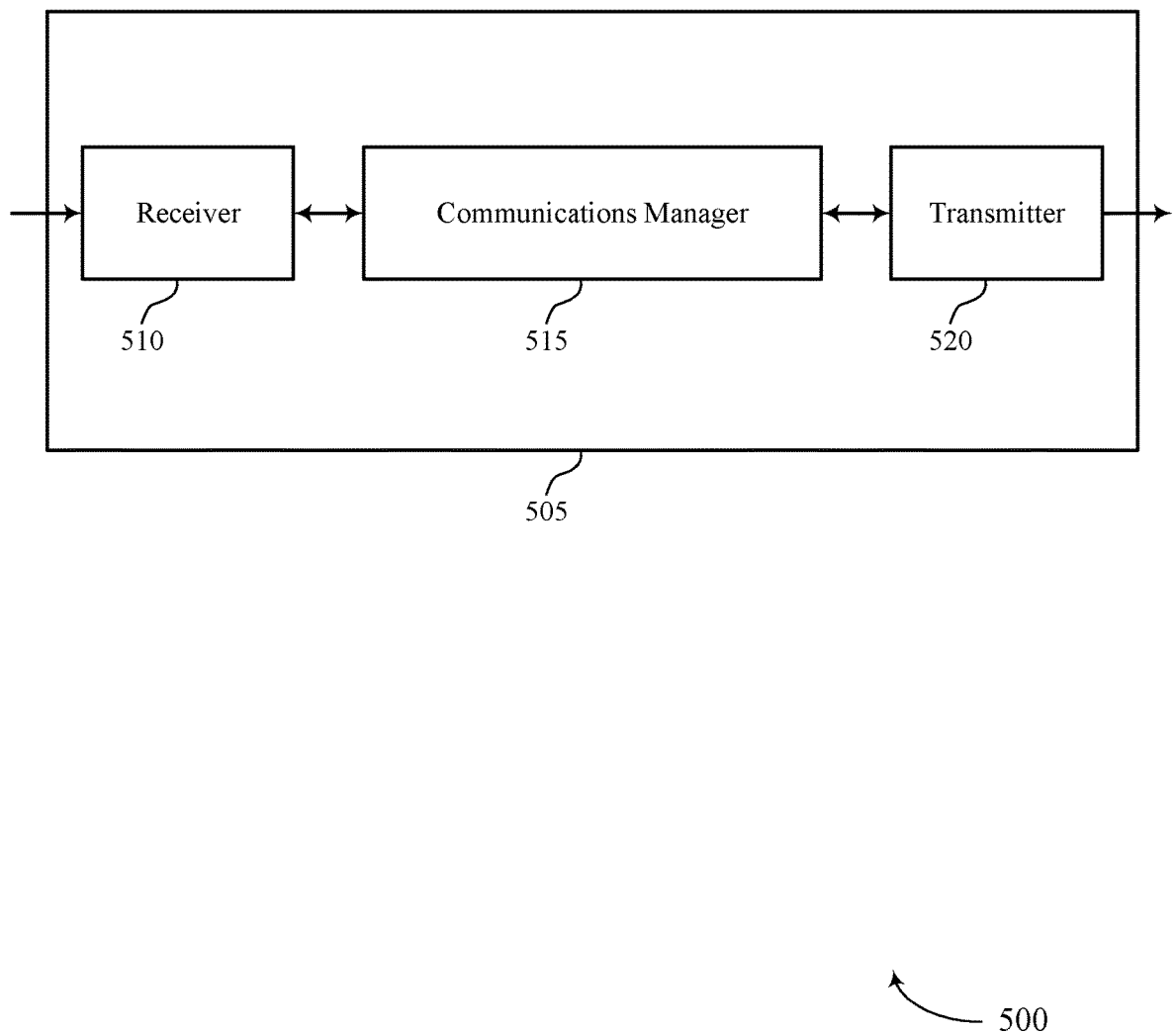
FIGS. 5 and 6 show block diagrams of devices that support enhanced TRS patterns in accordance with aspects of the present disclosure.

FIG. 5 shows a block diagram 500 of a device 505 that supports enhanced TRS patterns in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to enhanced TRS patterns, or the like). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station, a UE capability to receive a first portion of a TRS and a second portion of the TRS, the first portion and the second portion associated with a TRS pattern, receive, from the base station, an indication of the TRS pattern, where the TRS pattern includes the first portion of the TRS pattern and the second portion of the TRS pattern. The first portion of the TRS pattern may include a first symbol gap of one or more symbols between TRSs, and the first portion and the second portion of the TRS pattern may include a second symbol gap between at least two TRSs. In some cases, the communications manager 515 may monitor for one or more TRSs according to the first portion of the TRS pattern and the second portion of the TRS pattern. The communications manager 515 may receive one or more TRSs according to the first portion of the TRS pattern and the second portion of the TRS pattern. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 515 as described herein may be implemented for a UE 115 to reliably acquire a TRS to perform time and frequency tracking. For example, if the UE 115 is traveling at a high speed, the UE 115 may implement these techniques for an enhanced TRS pattern to increase a pull-in range for the TRS, despite a higher doppler spread based on the high speed.

The communications manager 515 may be an example of means for performing various aspects of managing smart repeaters as described herein. The communications manager 515, or its sub-components, may be implemented in hardware (e.g., in communications management circuitry). The circuitry may comprise of processor, digital signal processor (DSP), an ASIC, an FPGA or other programmable logic device, discrete gate or transistor logic, discrete hardware components, or any combination thereof designed to perform the functions described in the present disclosure.

In another implementation, the communications manager 515, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA or other programmable logic device.

In some examples, the communications manager 515 may be configured to perform various operations (e.g., receiving, determining, transmitting) using or otherwise in cooperation with the receiver 510, the transmitter 520, or both.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
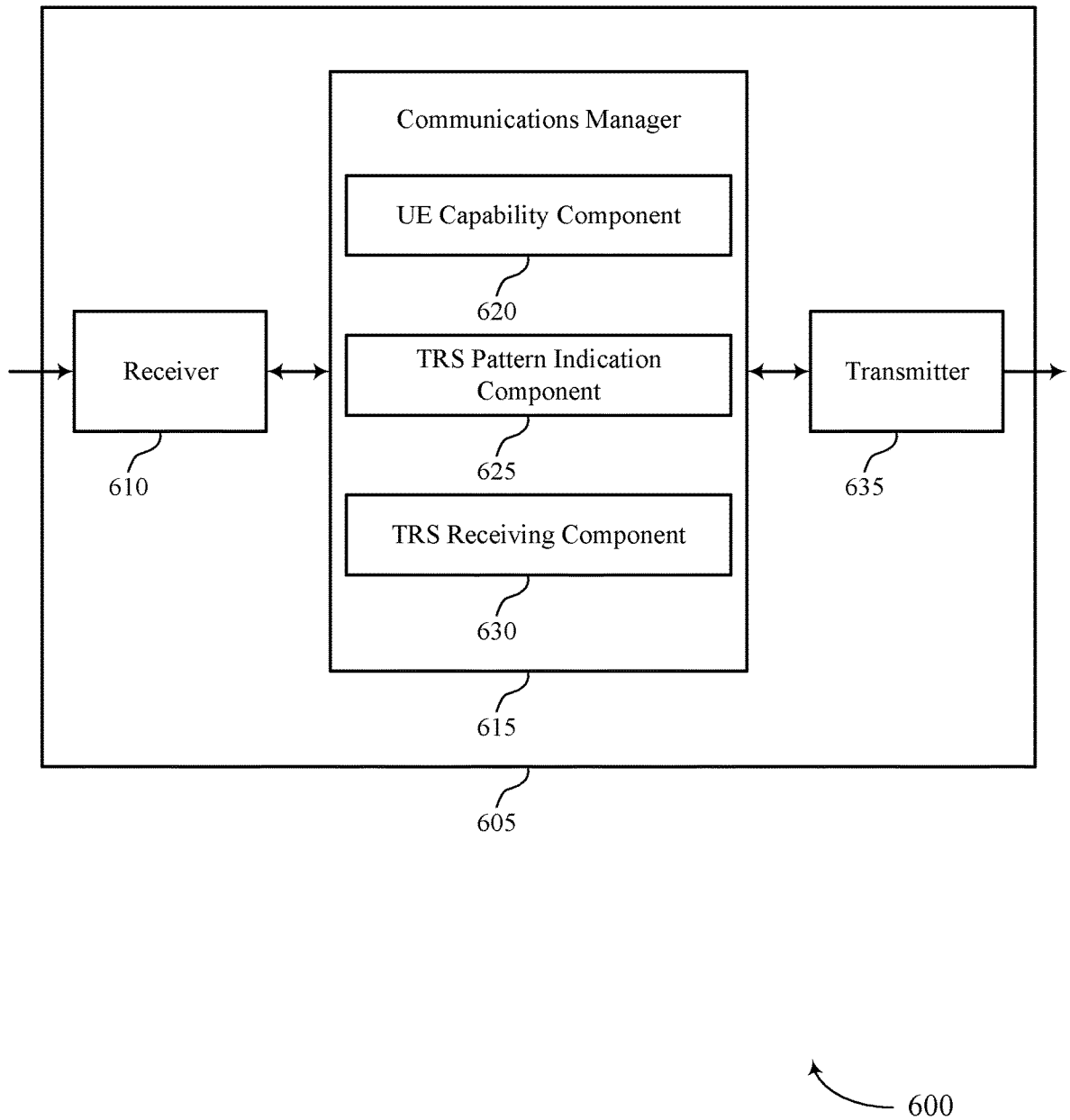

FIG. 6 shows a block diagram 600 of a device 605 that supports enhanced TRS patterns in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to enhanced TRS patterns, or the like). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a UE capability component 620, a TRS pattern indication component 625, and a TRS receiving component 630. The communications manager 615 may be an example of aspects of the communications manager 810 described herein.

The UE capability component 620 may transmit, to a base station, a UE capability to receive a first portion of a TRS and a second portion of the TRS, the first portion and the second portion associated with a TRS pattern.

The TRS pattern indication component 625 may receive, from the base station, an indication of the TRS pattern, where the TRS pattern includes the first portion of the TRS pattern and the second portion of the TRS pattern. The first portion of the TRS pattern may include a first symbol gap of one or more symbols between TRSs, and the first portion and the second portion of the TRS pattern may include a second symbol gap between at least two TRSs.

In some cases, the TRS receiving component 630 may monitor for multiple TRSs according to the first portion of the TRS pattern and the second portion of the TRS pattern. The TRS receiving component 630 may receive one or more TRSs according to the first portion of the TRS pattern and the second portion of the TRS pattern.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
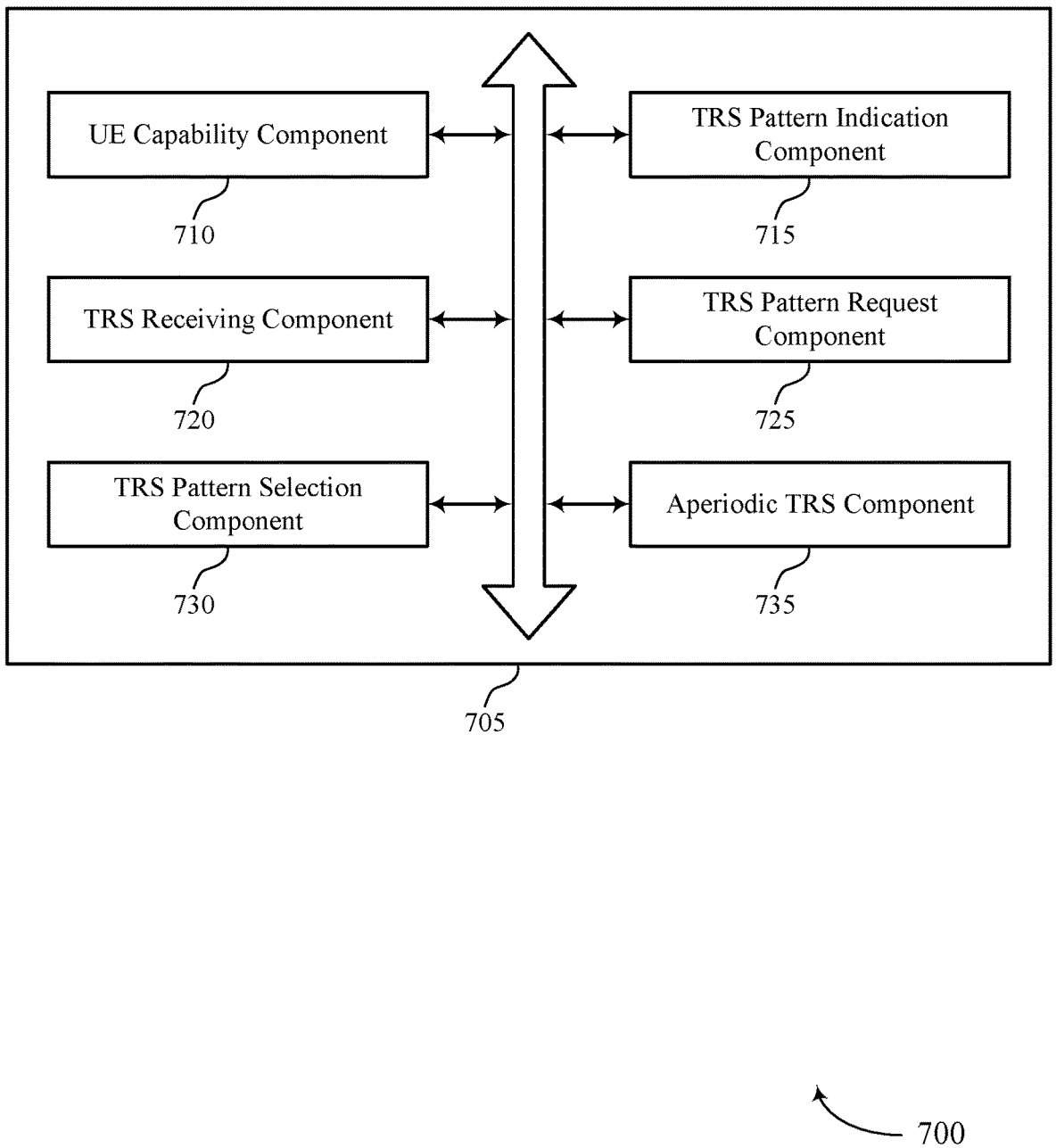
FIG. 7 shows a block diagram of a communications manager that supports enhanced TRS patterns in accordance with aspects of the present disclosure.

FIG. 7 shows a block diagram 700 of a communications manager 705 that supports enhanced TRS patterns in accordance with aspects of the present disclosure. The communications manager 705 may be an example of aspects of a communications manager 515, a communications manager 615, or a communications manager 810 described herein. The communications manager 705 may include a UE capability component 710, a TRS pattern indication component 715, a TRS receiving component 720, a TRS pattern request component 725, a TRS pattern selection component 730, and an aperiodic TRS component 735. Each of these modules may communicate, directly or indirectly, with one another (e.g., via one or more buses).

The UE capability component 710 may transmit, to a base station, a UE capability to receive a first portion of a TRS and a second portion of the TRS, the first portion and the second portion associated with a TRS pattern.

The TRS pattern indication component 715 may receive, from the base station, an indication of the TRS pattern, where the TRS pattern includes the first portion of the TRS pattern and the second portion of the TRS pattern. The first portion of the TRS pattern may include a first symbol gap of one or more symbols between TRSs, and the first portion and the second portion of the TRS pattern may include a second symbol gap between at least two TRSs. In some cases, the indication of the TRS pattern is received via DCI. In some cases, the first portion of the TRS pattern includes a four symbol gap between TRS, and the first portion and the second portion of the TRS pattern include a smaller symbol gap between at least two TRS. In some cases, a TRS of the second portion of the TRS pattern is between TRS of the first portion, before the TRS of the first portion, or after the TRS of the first portion.

The TRS receiving component 720 may receive one or more TRSs according to the first portion of the TRS pattern and the second portion of the TRS pattern. In some cases, the TRS pattern spans a slot or a set of slots. In some cases, the first portion of the TRS pattern spans a TRS bandwidth, and the second portion of the TRS pattern spans a subset of the TRS bandwidth. In some cases, the TRS receiving component 720 may perform a time and frequency synchronization based on receiving the one or more tracking reference signals.

The TRS pattern request component 725 may transmit a request for the second portion of the TRS pattern to the base station. In some examples, the TRS pattern request component 725 may detect the UE is moving at a speed that satisfies a speed threshold, where the request is transmitted based on the detecting. The TRS pattern selection component 730 may select the TRS pattern from a table of patterns based on the indication of the TRS pattern.

In some examples, the TRS pattern selection component 730 may receive a MAC-CE from the base station indicating the table of patterns from a set of tables of patterns. In some examples, the TRS pattern selection component 730 may receive RRC signaling from the base station configuring the table of patterns. In some cases, the indication of the TRS pattern corresponds an index of the table of patterns. The aperiodic TRS component 735 may receive DCI allocating an aperiodic resource for the set of TRS. In some examples, the aperiodic TRS component 735 may receive an indication of a triggering state from the base station via DCI or a MAC-CE, where the TRS pattern is based on the triggering state.

Figure 8:
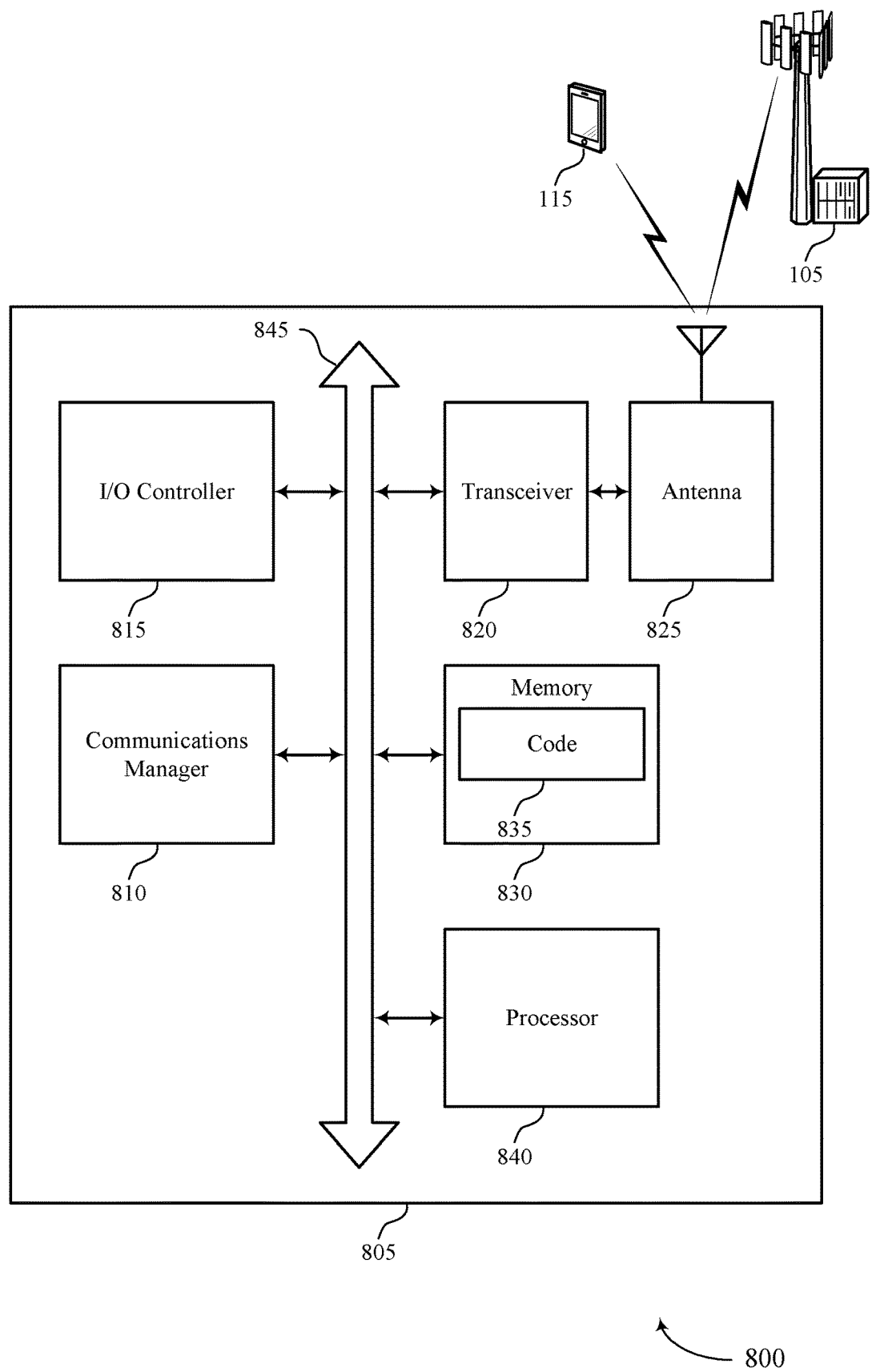
FIG. 8 shows a diagram of a system including a device that supports enhanced TRS patterns in accordance with aspects of the present disclosure.

FIG. 8 shows a diagram of a system 800 including a device 805 that supports enhanced TRS patterns in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station, a UE capability to receive a first portion of a TRS and a second portion of the TRS, the first portion and the second portion associated with a TRS pattern, receive, from the base station, an indication of the TRS pattern, where the TRS pattern includes the first portion of the TRS pattern and the second portion of the TRS pattern. The first portion of the TRS pattern may include a first symbol gap of one or more symbols between TRSs, and the first portion and the second portion of the TRS pattern may include a second symbol gap between at least two TRSs. In some cases, the communications manager 810 may monitor for one or more TRSs according to the first portion. The communications manager 810 may receive one or more TRSs according to the first portion of the TRS pattern and the second portion of the TRS pattern.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting enhanced TRS patterns).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
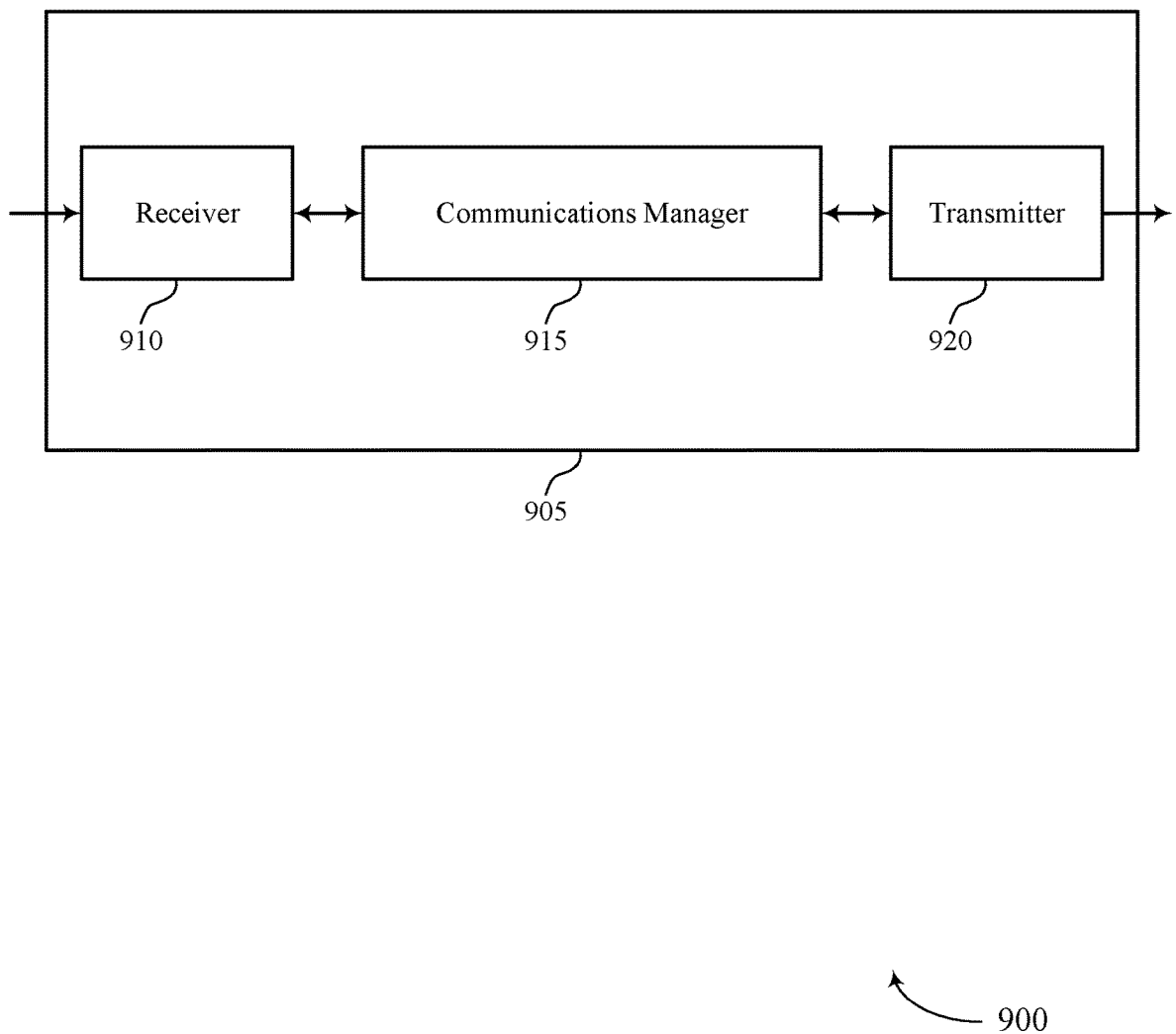
FIGS. 9 and 10 show block diagrams of devices that support enhanced TRS patterns in accordance with aspects of the present disclosure.

FIG. 9 shows a block diagram 900 of a device 905 that supports enhanced TRS patterns in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to enhanced TRS patterns, or the like). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, an indication of a UE capability. In some cases, the communications manager 915 may receive, from a UE, an indication of a UE capability to receive a first portion of the TRS and a second portion of the TRS, the first portion and the second portion associated with a TRS pattern. The communications manager 915 may transmit, to the UE, an indication of a TRS pattern. The TRS pattern may include a first portion and a second portion for multiple TRSs based on the received indication of the UE capability, where the first portion of the TRS pattern may include a first symbol gap of one or more symbols between TRSs, and the first portion and the second portion of the TRS pattern may include a second symbol gap between at least two TRSs. In some cases, the communications manager 915 select the TRS pattern including the first portion and the second portion for the multiple TRSs based on receiving the UE capability. The communications manager 915 may transmit the set of TRS according to the first portion of the TRS pattern and the second portion of the TRS pattern. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 915 may be an example of means for performing various aspects of managing smart repeaters as described herein. The communications manager 915, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 915, or its sub-components, may be implemented in code (e.g., as communications management software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device.

In some examples, the communications manager 915 may be configured to perform various operations (e.g., receiving, determining, transmitting) using or otherwise in cooperation with the receiver 910, the transmitter 920, or both.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
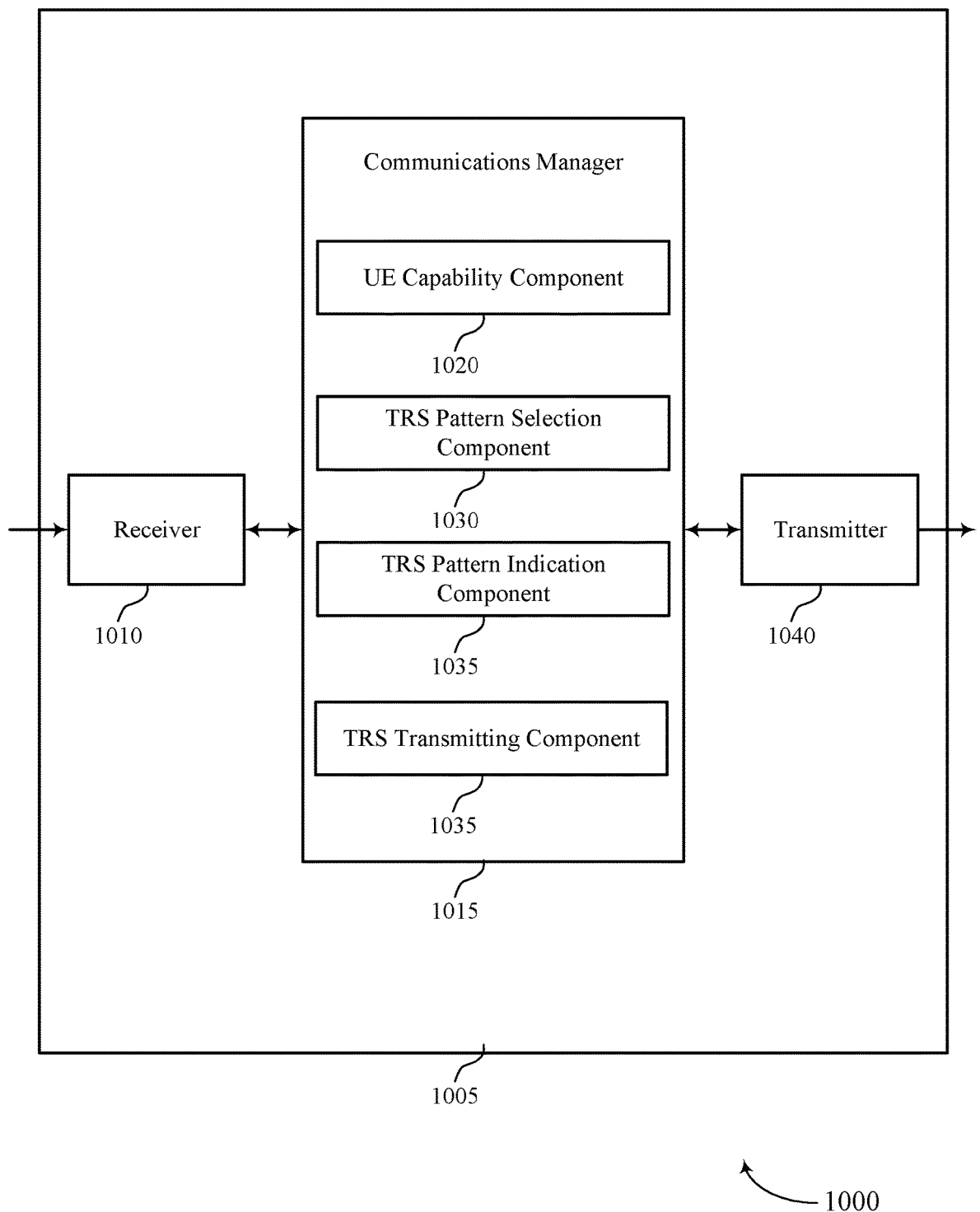

FIG. 10 shows a block diagram 1000 of a device 1005 that supports enhanced TRS patterns in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to enhanced TRS patterns, or the like). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a UE capability component 1020, a TRS pattern selection component 1025, a TRS pattern indication component 1030, and a TRS transmitting component 1035. The communications manager 1015 may be an example of aspects of the communications manager 1210 described herein.

The UE capability component 1020 may receive, from a UE, an indication of a UE capability. In some cases, the UE capability component 1020 may receive, from the UE an indication of a capability to receive a first portion of a TRS and a second portion of a TRS, the first portion and the second portion associated with a TRS pattern. The TRS pattern indication component 1030 may transmit, to the UE, an indication of a TRS pattern including a first portion and a second portion for multiple TRSs based on the received indication of the UE capability. The first portion of the TRS pattern may include a first symbol gap of one or more symbols between TRSs, and the first portion and the second portion of the TRS pattern may include a second symbol gap between at least two TRSs. In some examples, the first symbol gap in time between multiple TRS symbols may not be sufficiently short enough to track a frequency offset or adjust a communication link for Doppler effects, such as in a high mobility scenario. Therefore, based on the UE capability, the device 1005 (e.g., a gNB) may include the second portion of the TRS pattern and may choose the second symbol gap such that the gap between two TRS symbols is short enough for frequency tracking, adjusting the communication link for Doppler effects, or the like. In some cases, the TRS pattern selection component 1025 may select the TRS pattern including the first portion and the second portion for a set of TRS based on receiving the UE capability. The TRS transmitting component 1035 may transmit the set of TRS according to the first portion of the TRS pattern and the second portion of the TRS pattern.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
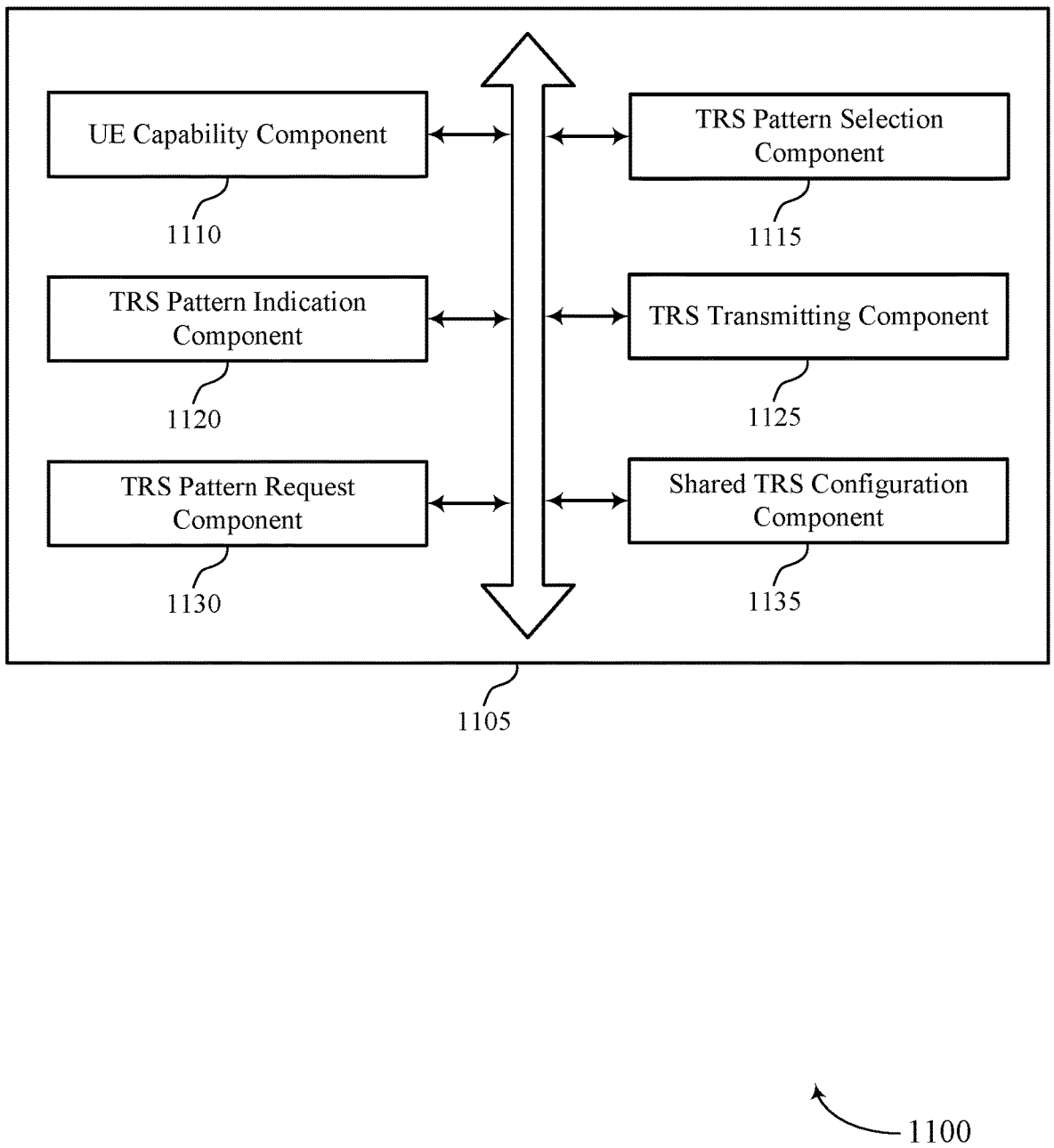
FIG. 11 shows a block diagram of a communications manager that supports enhanced TRS patterns in accordance with aspects of the present disclosure.

FIG. 11 shows a block diagram 1100 of a communications manager 1105 that supports enhanced TRS patterns in accordance with aspects of the present disclosure. The communications manager 1105 may be an example of aspects of a communications manager 915, a communications manager 1015, or a communications manager 1210 described herein. The communications manager 1105 may include a UE capability component 1110, a TRS pattern selection component 1115, a TRS pattern indication component 1120, a TRS transmitting component 1125, a TRS pattern request component 1130, and a shared TRS configuration component 1135. Each of these modules may communicate, directly or indirectly, with one another (e.g., via one or more buses).

The UE capability component 1110 may receive, from a UE, an indication of a UE capability. In some cases, the UE capability component 1110 may receive, from the UE, an indication of a UE capability to receive a first portion of a TRS and a second portion of a TRS, the first portion and the second portion associated with a TRS pattern. In some cases, the TRS pattern selection component 1115 may select the TRS pattern including the first portion and the second portion for a set of TRS based on receiving the UE capability. In some cases, the first portion of the TRS pattern includes a four symbol gap between TRS, and the first portion and the second portion of the TRS pattern include a two symbol gap between at least two TRS. In some cases, a TRS of the second portion of the TRS pattern is between TRS of the first portion, before the TRS of the first portion, or after the TRS of the first portion.

The TRS pattern indication component 1120 may transmit, to the UE, an indication of a TRS pattern. The TRS pattern may include a first portion and a second portion for multiple TRSs based on the received indication of the UE capability. The first portion of the TRS pattern may include a first symbol gap of one or more symbols between TRSs, and the first portion and the second portion of the TRS pattern may include a second symbol gap between at least two TRSs. In some examples, the TRS pattern indication component 1120 may transmit a MAC-CE to the UE indicating the table of patterns from a set of tables of patterns.

In some examples, the TRS pattern indication component 1120 may transmit RRC signaling to the UE configuring the table of patterns.

In some examples, the TRS pattern indication component 1120 may transmit DCI allocating an aperiodic resource for the set of TRS. In some examples, the TRS pattern indication component 1120 may transmit an indication of a triggering state from the base station via DCI or a MAC-CE, where the TRS pattern is based on the triggering state. In some cases, the indication of the TRS pattern corresponds to an index of a table of patterns configured at the UE. In some cases, the indication of the TRS pattern is transmitted via DCI.

The TRS transmitting component 1125 may transmit the set of TRS according to the first portion of the TRS pattern and the second portion of the TRS pattern. In some cases, the TRS pattern spans a slot or a set of slots. In some cases, the first portion of the TRS pattern spans a TRS bandwidth, and the second portion of the TRS pattern spans a subset of the TRS bandwidth.

The TRS pattern request component 1130 may receive a request for the second portion of the TRS pattern from the UE based on a high speed of the UE. The shared TRS configuration component 1135 may transmit the indication of the TRS pattern to a second UE that is incapable of receiving the second portion of the TRS pattern. In some examples, the shared TRS configuration component 1135 may schedule a downlink shared channel resource for the second UE, where the downlink shared channel resource at least partially overlaps with the second portion of the TRS in time, frequency, antenna port, or any combination thereof, based on a modulation and coding scheme of the second UE being low.

In some examples, the shared TRS configuration component 1135 may schedule a second UE for a downlink shared channel during a slot including the set of TRS, where the second UE is incapable of receiving the second portion of the TRS pattern. In some examples, the shared TRS configuration component 1135 may transmit the indication of the TRS pattern to the second UE, where the indication configures the second UE for a zero-power channel state information reference signal during the second portion of the TRS pattern.

Figure 12:
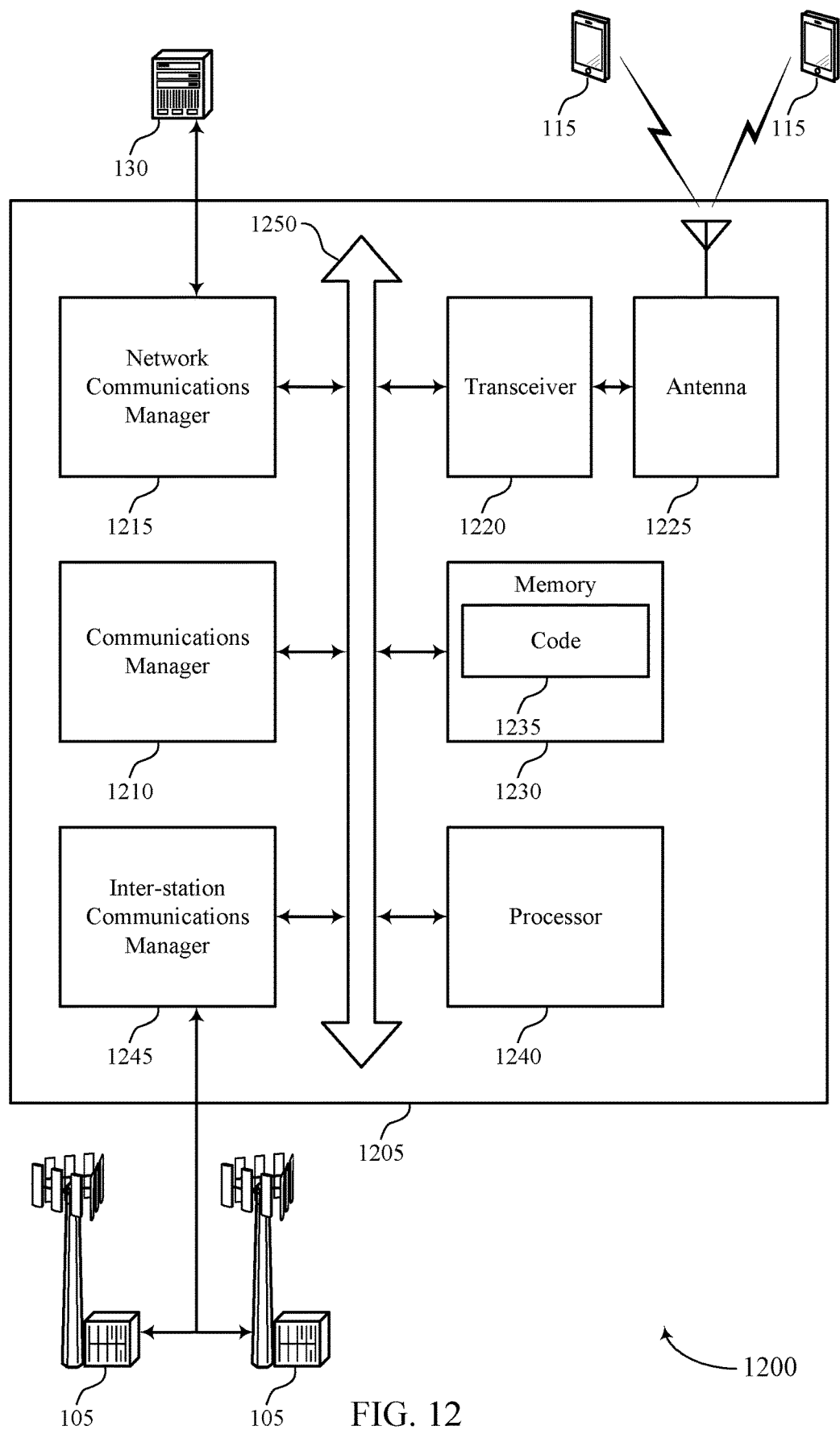
FIG. 12 shows a diagram of a system including a device that supports enhanced TRS patterns in accordance with aspects of the present disclosure.

FIG. 12 shows a diagram of a system 1200 including a device 1205 that supports enhanced TRS patterns in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, an indication of a UE capability. In some cases, the communications manager 1210 may receive an indication of a UE capability to receive a first portion of a TRS and a second portion of a TRS, the first portion and the second portion associated with a TRS pattern. In some cases, the communications manager 1210 may select the TRS pattern including the first portion and the second portion for a set of TRS based on receiving the UE capability. The communications manager 1210 may transmit, to the UE, an indication of the TRS pattern including a first portion and a second portion for multiple TRSs based on the received indication of the UE capability. The first portion of the TRS pattern may include a first symbol gap of one or more symbols between TRSs, and the first portion and the second portion of the TRS pattern may include a second symbol gap between at least two TRSs. The communications manager 1210 may transmit the set of TRS according to the first portion of the TRS pattern and the second portion of the TRS pattern.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting enhanced TRS patterns).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
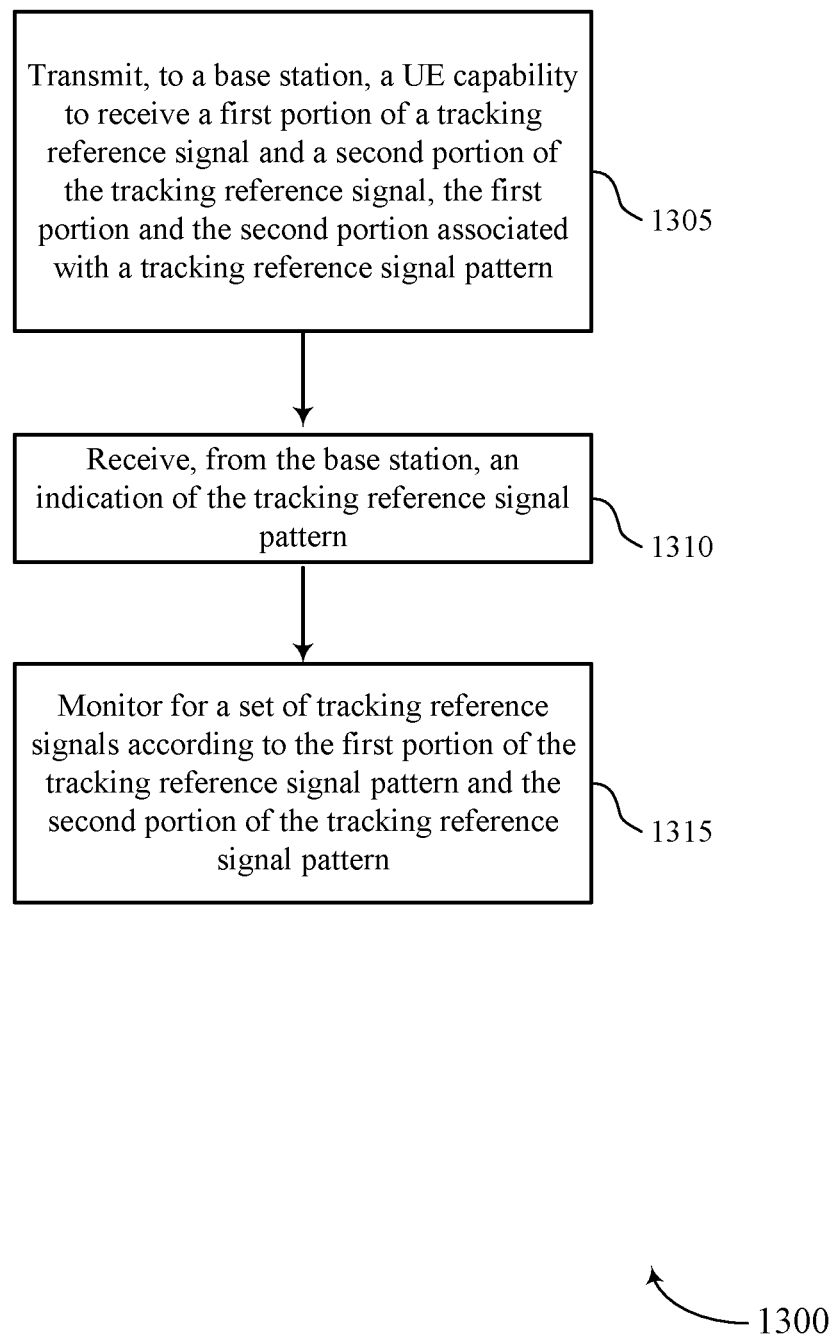
FIGS. 13 through 18 show flowcharts illustrating methods that support enhanced TRS patterns in accordance with aspects of the present disclosure.

FIG. 13 shows a flowchart illustrating a method 1300 that supports enhanced TRS patterns in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station, a UE capability to receive a first portion of a TRS and a second portion of the TRS, the first portion and the second portion associated with a TRS pattern. The operations of 1305 may be performed according to the methods described herein. In some examples, aspects of the operations of 1305 may be performed by an UE capability component as described with reference to FIGS. 5 through 8.

At 1310, the UE may receive, from the base station, an indication of the TRS pattern, where the TRS pattern includes the first portion of the TRS pattern and the second portion of the TRS pattern. The operations of 1310 may be performed according to the methods described herein. In some examples, aspects of the operations of 1310 may be performed by a TRS pattern indication component as described with reference to FIGS. 5 through 8.

At 1315, the UE may monitor for a set of TRS according to the first portion of the TRS pattern and the second portion of the TRS pattern. The operations of 1315 may be performed according to the methods described herein. In some examples, aspects of the operations of 1315 may be performed by a TRS receiving component as described with reference to FIGS. 5 through 8.

Figure 14:
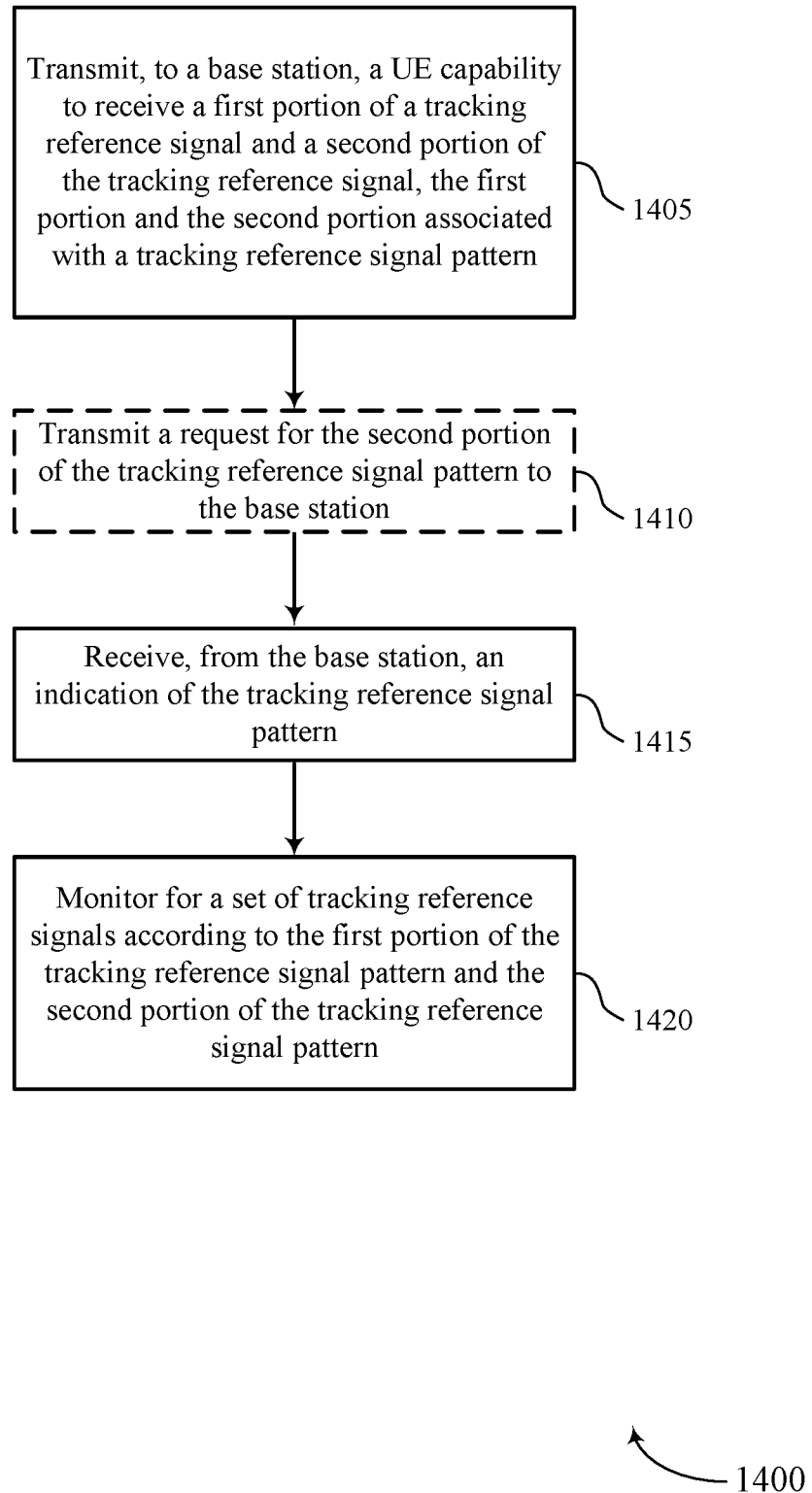

FIG. 14 shows a flowchart illustrating a method 1400 that supports enhanced TRS patterns in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, a UE capability to receive a first portion of a TRS and a second portion of the TRS, the first portion and the second portion associated with a TRS pattern. The operations of 1405 may be performed according to the methods described herein. In some examples, aspects of the operations of 1405 may be performed by a UE capability component as described with reference to FIGS. 5 through 8.

At 1410, the UE may transmit a request for the second portion of the TRS pattern to the base station. The operations of 1410 may be performed according to the methods described herein. In some examples, aspects of the operations of 1410 may be performed by a TRS pattern request component as described with reference to FIGS. 5 through 8.

At 1415, the UE may receive, from the base station, an indication of the TRS pattern, where the TRS pattern includes the first portion of the TRS pattern and the second portion of the TRS pattern. The operations of 1415 may be performed according to the methods described herein. In some examples, aspects of the operations of 1415 may be performed by a TRS pattern indication component as described with reference to FIGS. 5 through 8.

At 1420, the UE may monitor for a set of TRS according to the first portion of the TRS pattern and the second portion of the TRS pattern. The operations of 1420 may be performed according to the methods described herein. In some examples, aspects of the operations of 1420 may be performed by a TRS receiving component as described with reference to FIGS. 5 through 8.

Figure 15:
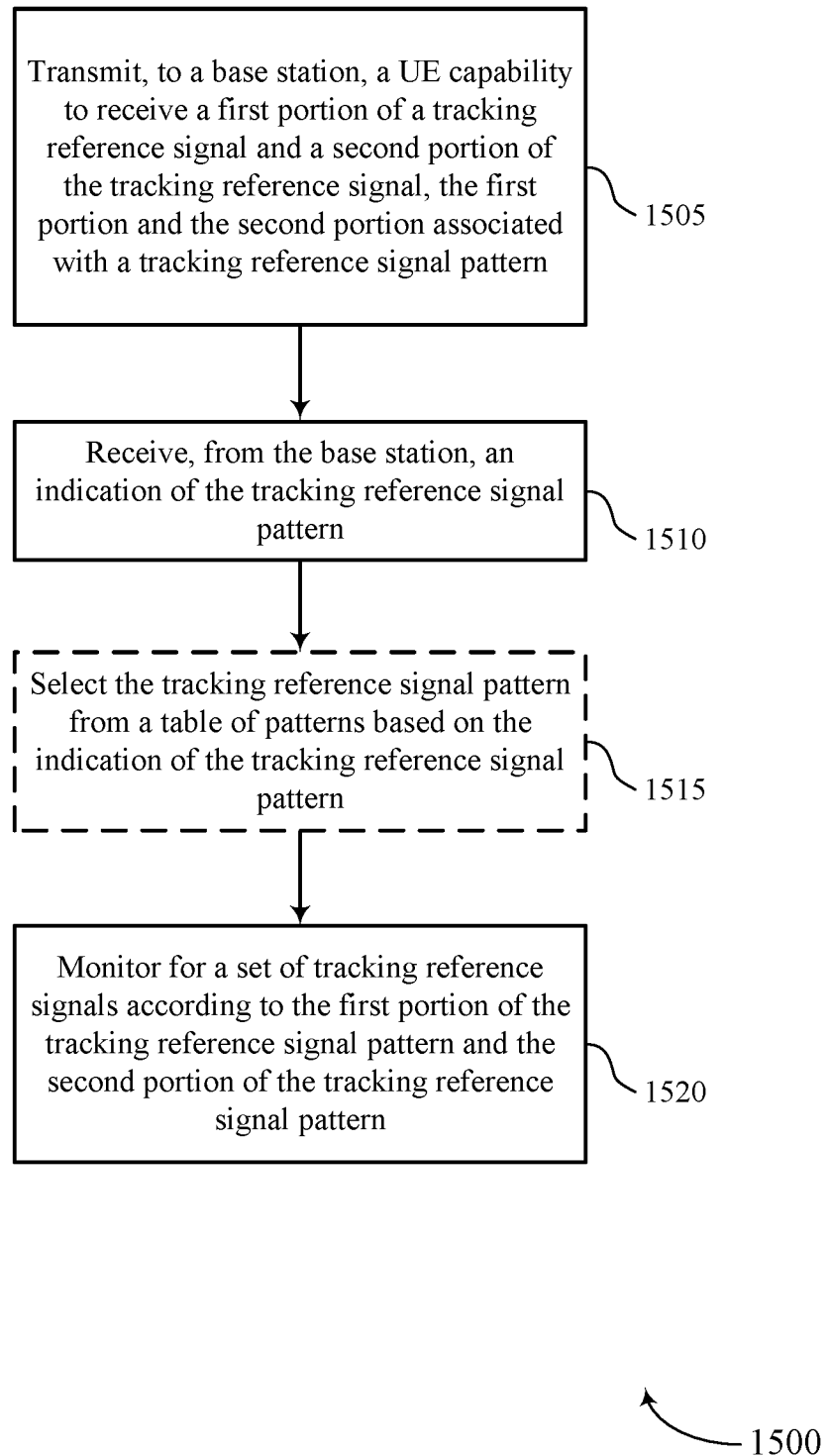

FIG. 15 shows a flowchart illustrating a method 1500 that supports enhanced TRS patterns in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, a UE capability to receive a first portion of a TRS and a second portion of the TRS, the first portion and the second portion associated with a TRS pattern. The operations of 1505 may be performed according to the methods described herein. In some examples, aspects of the operations of 1505 may be performed by a UE capability component as described with reference to FIGS. 5 through 8.

At 1510, the UE may receive, from the base station, an indication of the TRS pattern, where the TRS pattern includes the first portion of the TRS pattern and the second portion of the TRS pattern. The operations of 1510 may be performed according to the methods described herein. In some examples, aspects of the operations of 1510 may be performed by a TRS pattern indication component as described with reference to FIGS. 5 through 8.

At 1515, the UE may select the TRS pattern from a table of patterns based on the indication of the TRS pattern. The operations of 1515 may be performed according to the methods described herein. In some examples, aspects of the operations of 1515 may be performed by a TRS pattern selection component as described with reference to FIGS. 5 through 8.

At 1520, the UE may monitor for a set of TRS according to the first portion of the TRS pattern and the second portion of the TRS pattern. The operations of 1520 may be performed according to the methods described herein. In some examples, aspects of the operations of 1520 may be performed by a TRS receiving component as described with reference to FIGS. 5 through 8.

Figure 16:
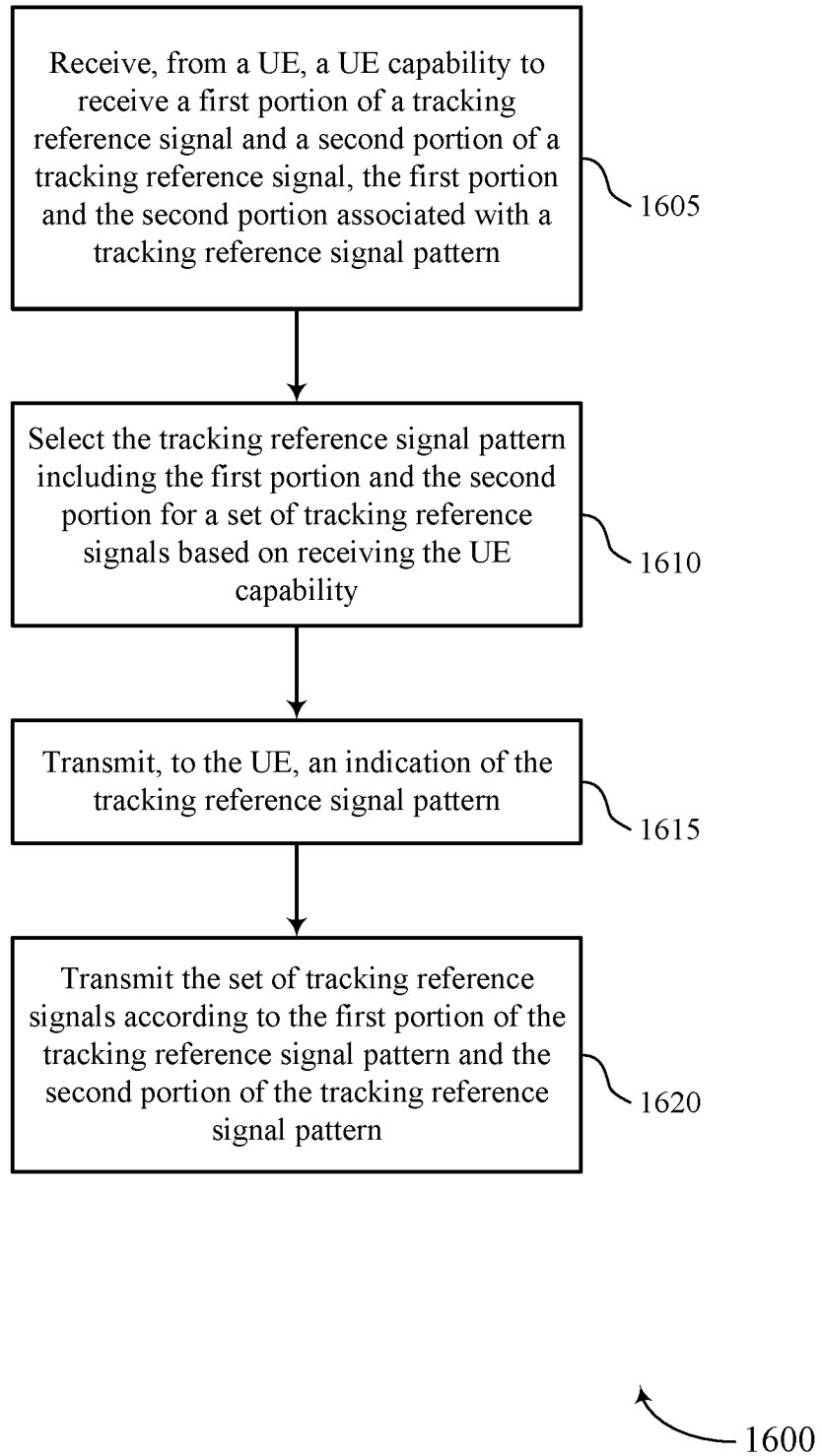

FIG. 16 shows a flowchart illustrating a method 1600 that supports enhanced TRS patterns in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive, from a UE, a UE capability to receive a first portion of a TRS and a second portion of a TRS, the first portion and the second portion associated with a TRS pattern. The operations of 1605 may be performed according to the methods described herein. In some examples, aspects of the operations of 1605 may be performed by a UE capability component as described with reference to FIGS. 9 through 12.

At 1610, the base station may select the TRS pattern including the first portion and the second portion for a set of TRS based on receiving the UE capability. The operations of 1610 may be performed according to the methods described herein. In some examples, aspects of the operations of 1610 may be performed by a TRS pattern selection component as described with reference to FIGS. 9 through 12.

At 1615, the base station may transmit, to the UE, an indication of the TRS pattern. The operations of 1615 may be performed according to the methods described herein. In some examples, aspects of the operations of 1615 may be performed by a TRS pattern indication component as described with reference to FIGS. 9 through 12.

At 1620, the base station may transmit the set of TRS according to the first portion of the TRS pattern and the second portion of the TRS pattern. The operations of 1620 may be performed according to the methods described herein. In some examples, aspects of the operations of 1620 may be performed by a TRS transmitting component as described with reference to FIGS. 9 through 12.

Figure 17:
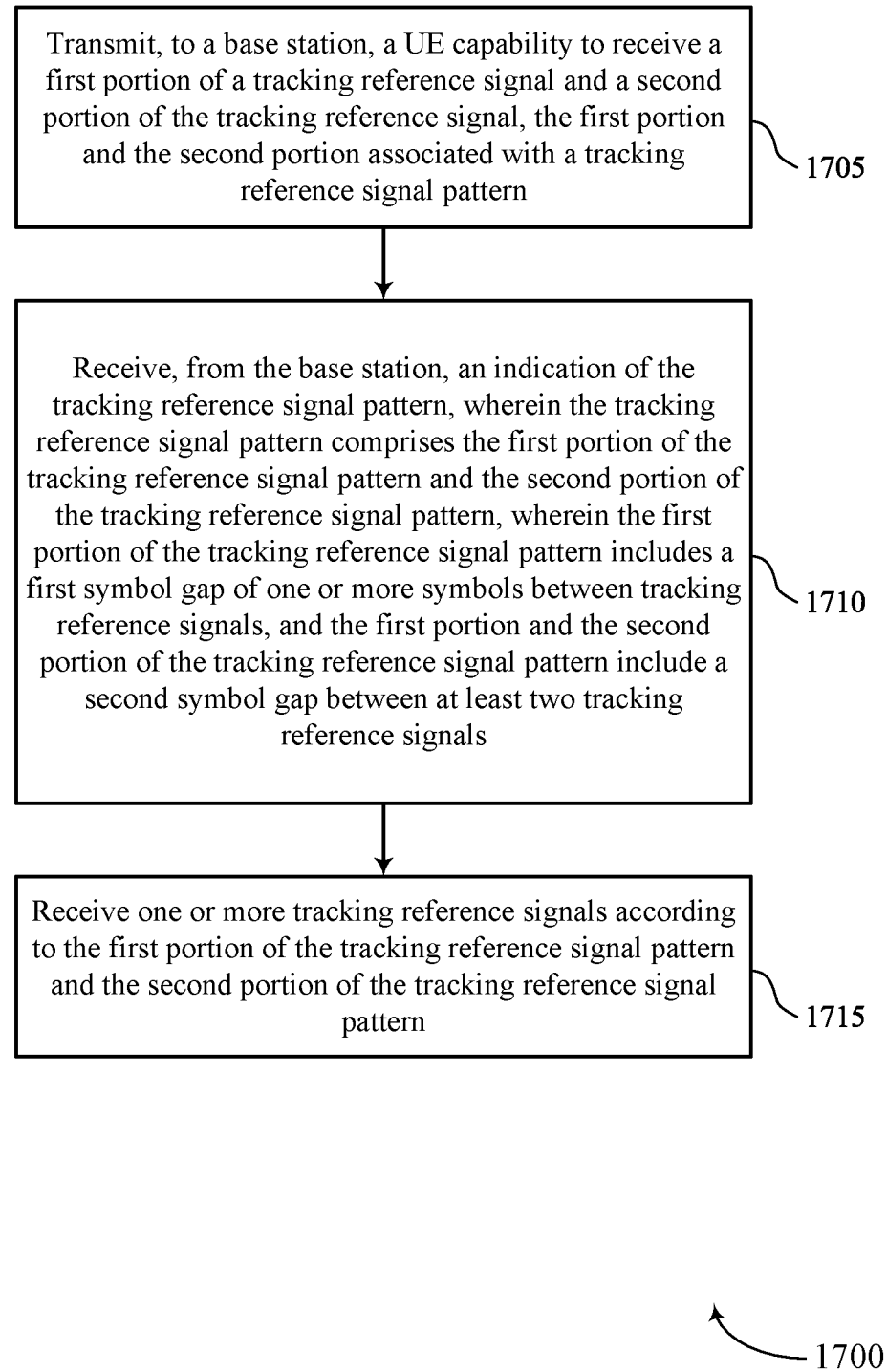

FIG. 17 shows a flowchart illustrating a method 1700 that supports enhanced TRS patterns in accordance with aspects of the present disclosure. The operations of the method 1700 may be implemented by a UE or its components as described herein. For example, the operations of method 1700 may be performed by a communications manager as described with reference to FIGS. 5 through 8. In some examples, a UE may execute a set of instructions to control the functional elements of the UE to perform the described functions. Additionally or alternatively, the UE may perform aspects of the described functions using special-purpose hardware.

At 1705, the method may include transmitting, to a base station, a UE capability to receive a first portion of a TRS and a second portion of the TRS, the first portion and the second portion associated with a TRS pattern. The operations of 1705 may be performed in accordance with examples as disclosed herein. In some examples, aspects of the operations of 1705 may be performed by a UE capability component as described with reference to FIGS. 5 through 8.

At 1710, the method may include receiving, from the base station, an indication of the TRS pattern, where the TRS pattern includes the first portion of the TRS pattern and the second portion of the TRS pattern, and where the first portion of the TRS pattern includes a first symbol gap of one or more symbols between TRSs, and the first portion and the second portion of the TRS pattern include a second symbol gap between at least two TRSs. The operations of 1710 may be performed in accordance with examples as disclosed herein. In some examples, aspects of the operations of 1710 may be performed by a TRS pattern indication component as described with reference to FIGS. 5 through 8.

At 1715, the method may include receiving one or more TRSs according to the first portion of the TRS pattern and the second portion of the TRS pattern. The operations of 1715 may be performed in accordance with examples as disclosed herein. In some examples, aspects of the operations of 1715 may be performed by a TRS receiving component as described with reference to FIGS. 5 through 8.

Figure 18:
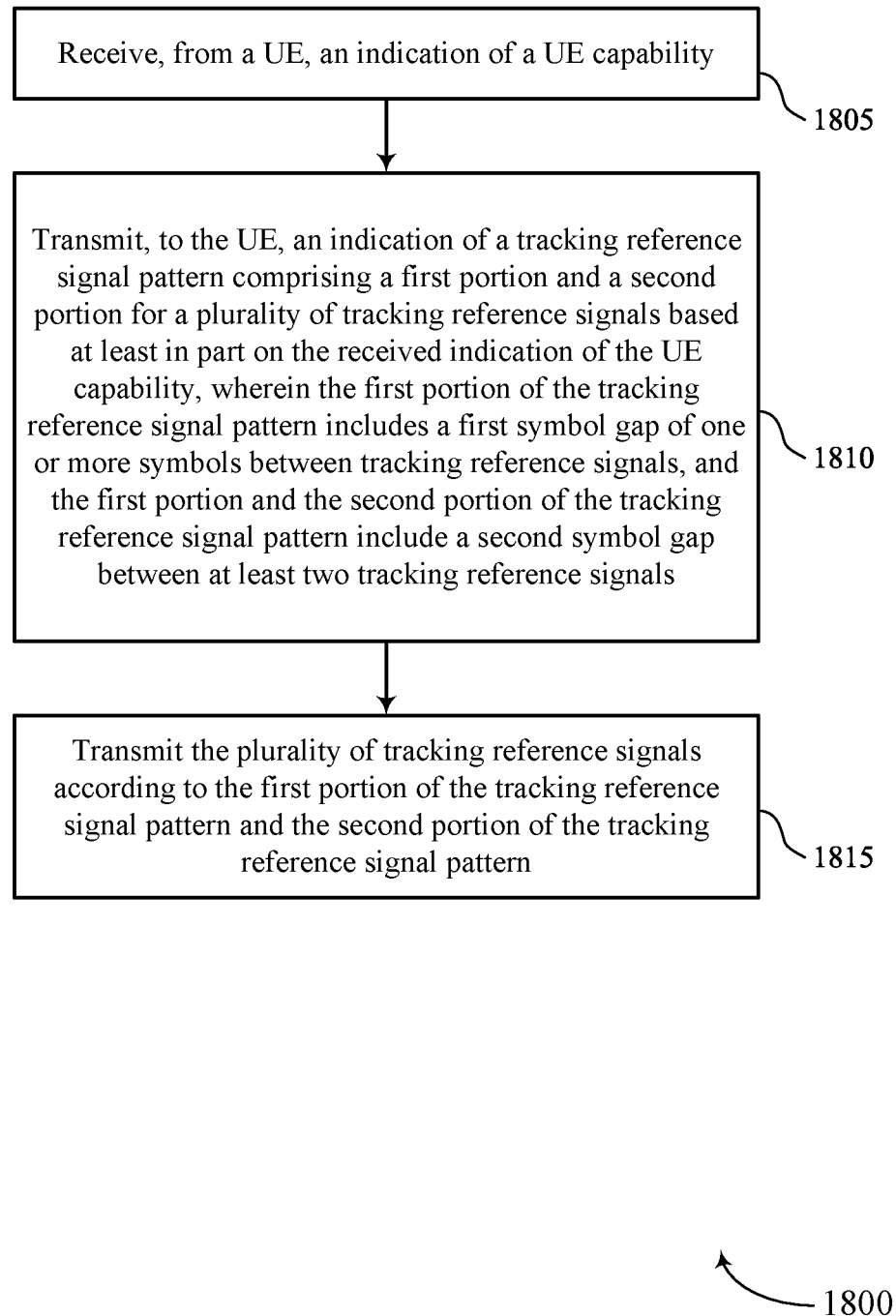

FIG. 18 shows a flowchart illustrating a method 1800 that supports enhanced TRS patterns in accordance with aspects of the present disclosure. The operations of the method 1800 may be implemented by a base station or its components as described herein. For example, the operations of the method 1800 may be performed by a base station as described with reference to FIGS. 9 through 12. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, an indication of a UE capability. The operations of 1805 may be performed in accordance with examples as disclosed herein. In some examples, aspects of the operations of 1805 may be performed by a UE capability component as described with reference to FIGS. 9 through 12.

At 1810, the method may include transmitting, to the UE, an indication of a TRS pattern including a first portion and a second portion for a set of multiple TRSs based on the received indication of the UE capability, where the first portion of the TRS pattern includes a first symbol gap of one or more symbols between TRSs, and the first portion and the second portion of the TRS pattern include a second symbol gap between at least two TRSs. The operations of 1810 may be performed in accordance with examples as disclosed herein. In some examples, aspects of the operations of 1810 may be performed by a TRS pattern indication component as described with reference to FIGS. 9 through 12.

At 1815, the method may include transmitting the set of multiple TRSs according to the first portion of the TRS pattern and the second portion of the TRS pattern. The operations of 1815 may be performed in accordance with examples as disclosed herein. In some examples, aspects of the operations of 1815 may be performed by a TRS transmitting component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, including: transmitting, to a base station, a UE capability to receive a first portion of a TRS and a second portion of the TRS, the first portion and the second portion associated with a TRS pattern; receiving, from the base station, an indication of the TRS pattern, where the TRS pattern includes the first portion of the TRS pattern and the second portion of the TRS pattern, where the first portion of the TRS pattern includes a first symbol gap of one or more symbols between TRSs, and the first portion and the second portion of the TRS pattern include a second symbol gap between at least two TRSs; and receiving one or more TRSs according to the first portion of the TRS pattern and the second portion of the TRS pattern.

Aspect 2: The method of aspect 1, further including: transmitting a request for the second portion of the TRS pattern to the base station.

Aspect 3: The method of aspect 2, further including: detecting the UE is moving at a speed that satisfies a speed threshold, where the request is transmitted based on the detecting.

Aspect 4: The method of any of aspects 1 through 3, further including: selecting the TRS pattern from a table of patterns based on the indication of the TRS pattern.

Aspect 5: The method of aspect 4, further including: receiving a MAC CE from the base station indicating the table of patterns from one or more tables of patterns.

Aspect 6: The method of any of aspects 4 through 5, where the indication of the TRS pattern corresponds an index of the table of patterns.

Aspect 7: The method of any of aspects 4 through 6, further including: receiving RRC signaling from the base station configuring the table of patterns.

Aspect 8: The method of any of aspects 1 through 7, where the indication of the TRS pattern is received via DCI.

Aspect 9: The method of any of aspects 1 through 8, where receiving the indication of the TRS pattern includes: receiving DCI allocating an aperiodic resource for the one or more TRSs.

Aspect 10: The method of aspect 9, further including: receiving an indication of a triggering state from the base station via DCI or a MAC CE, where the TRS pattern is based on the triggering state.

Aspect 11: The method of any of aspects 1 through 10, where a TRS of the second portion of the TRS pattern is between TRSs of the first portion, before the TRSs of the first portion, or after the TRSs of the first portion.

Aspect 12: The method of any of aspects 1 through 11, where the TRS pattern spans a slot or one or more slots.

Aspect 13: The method of any of aspects 1 through 12, where the first portion of the TRS pattern spans a TRS bandwidth, and the second portion of the TRS pattern spans a subset of the TRS bandwidth.

Aspect 14: The method of any of aspects 1 through 13, further including: performing a time and frequency synchronization based on receiving the one or more TRSs.

Aspect 15: A method for wireless communications at a base station, including: receiving, from a UE, an indication of a UE capability; transmitting, to the UE, an indication of a TRS pattern including a first portion and a second portion for one or more TRSs based on the received indication of the UE capability, where the first portion of the TRS pattern includes a first symbol gap of one or more symbols between TRSs, and the first portion and the second portion of the TRS pattern include a second symbol gap between at least two TRSs; and transmitting the one or more TRSs according to the first portion of the TRS pattern and the second portion of the TRS pattern.

Aspect 16: The method of aspect 15, further including: receiving a request for the second portion of the TRS pattern from the UE based on a high speed of the UE.

Aspect 17: The method of any of aspects 15 through 16, where the indication of the TRS pattern corresponds to an index of a table of patterns configured at the UE.

Aspect 18: The method of aspect 17, further including: transmitting a MAC CE to the UE indicating the table of patterns from one or more tables of patterns.

Aspect 19: The method of any of aspects 17 through 18, further including: transmitting RRC signaling to the UE configuring the table of patterns.

Aspect 20: The method of any of aspects 15 through 19, where the indication of the TRS pattern is transmitted via DCI.

Aspect 21: The method of any of aspects 15 through 20, where transmitting the indication of the TRS pattern includes: transmitting DCI allocating an aperiodic resource for the one or more TRSs.

Aspect 22: The method of aspect 21, further including: transmitting an indication of a triggering state from the base station via DCI or a MAC CE, where the TRS pattern is based on the triggering state.

Aspect 23: The method of aspect 22, where a TRS of the second portion of the TRS pattern is between TRSs of the first portion, before the TRSs of the first portion, or after the TRSs of the first portion.

Aspect 24: The method of any of aspects 15 through 23, where the first portion of the TRS pattern spans a TRS bandwidth, and the second portion of the TRS pattern spans a subset of the TRS bandwidth.

Aspect 25: The method of any of aspects 15 through 24, where the UE is a first UE, further including: transmitting the indication of the TRS pattern to a second UE that is incapable of receiving the second portion of the TRS pattern; and scheduling a downlink shared channel resource for the second UE, where the downlink shared channel resource at least partially overlaps with the second portion of the TRS in time, frequency, antenna port, or any combination thereof, based on a modulation and coding scheme of the second UE being low.

Aspect 26: The method of any of aspects 15 through 25, where the UE is a first UE, further including: scheduling a second UE for a downlink shared channel during a slot including the one or more TRSs, where the second UE is incapable of receiving the second portion of the TRS pattern; and transmitting the indication of the TRS pattern to the second UE, where the indication configures the second UE for a zero-power channel state information reference signal during the second portion of the TRS pattern.

Aspect 27: An apparatus for wireless communications at a UE, including a processor; and memory coupled to the processor, the processor and memory configured to perform a method of any of aspects 1 through 14.

Aspect 28: An apparatus for wireless communications at a UE, including at least one means for performing a method of any of aspects 1 through 14.

Aspect 29: A non-transitory computer-readable medium storing code for wireless communications at a UE, the code including instructions executable by a processor to perform a method of any of aspects 1 through 14.

Aspect 30: An apparatus for wireless communications at a base station, including a processor; and memory coupled to the processor, the processor and memory configured to perform a method of any of aspects 15 through 26.

Aspect 31: An apparatus for wireless communications at a base station, including at least one means for performing a method of any of aspects 15 through 26.

Aspect 32: A non-transitory computer-readable medium storing code for wireless communications at a base station, the code including instructions executable by a processor to perform a method of any of aspects 15 through 26.

Aspect 33: A method for wireless communications at a user equipment (UE), including: transmitting, to a base station, a UE capability to receive a first portion of a TRS and a second portion of the TRS, the first portion and the second portion associated with a TRS pattern; receiving, from the base station, an indication of the TRS pattern, where the TRS pattern includes the first portion of the TRS pattern and the second portion of the TRS pattern; and monitoring for one or more TRSs according to the first portion of the TRS pattern and the second portion of the TRS pattern.

Aspect 34: The method of aspect 33, further including: transmitting a request for the second portion of the TRS pattern to the base station.

Aspect 35: The method of any of aspects 33 or 34, further including: detecting the UE is moving at a speed that satisfies a speed threshold, where the request is transmitted based on the detecting.

Aspect 36: The method of any of aspects 33 through 35, further including: selecting the TRS pattern from a table of patterns based on the indication of the TRS pattern.

Aspect 37: The method of any of aspects 33 through 36, further including: receiving a MAC-CE from the base station indicating the table of patterns from one or more tables of patterns.

Aspect 38: The method of any of aspects 33 through 37, where the indication of the TRS pattern corresponds an index of the table of patterns.

Aspect 39: The method of any of aspects 33 through 38, further including: receiving RRC signaling from the base station configuring the table of patterns.

Aspect 40: The method of any of aspects 33 through 39, where the indication of the TRS pattern is received via DCI.

Aspect 41: The method of any of aspects 33 through 40, where receiving the indication of the TRS pattern includes: receiving DCI allocating an aperiodic resource for the one or more TRSs.

Aspect 42: The method of any of aspects 33 through 41, further including: receiving an indication of a triggering state from the base station via DCI or a MAC-CE, where the TRS pattern is based on the triggering state.

Aspect 43: The method of any of aspects 33 through 42, where the first portion of the TRS pattern includes a four symbol gap between TRSs, and the first portion and the second portion of the TRS pattern include a smaller symbol gap between at least two TRSs.

Aspect 44: The method of any of aspects 33 through 43, where a TRS of the second portion of the TRS pattern is between TRSs of the first portion, before the TRSs of the first portion, or after the TRSs of the first portion.

Aspect 45: The method of any of aspects 33 through 44, where the TRS pattern spans a slot or one or more slots.

Aspect 46: The method of any of aspects 33 through 45, where the first portion of the TRS pattern spans a TRS bandwidth, and the second portion of the TRS pattern spans a subset of the TRS bandwidth.

Aspect 47: A method for wireless communications at a base station, including: receiving, from a user equipment (UE), a UE capability to receive a first portion of a TRS and a second portion of a TRS, the first portion and the second portion associated with a TRS pattern; selecting the TRS pattern including the first portion and the second portion for one or more TRSs based on receiving the UE capability; transmitting, to the UE, an indication of the TRS pattern; and transmitting the one or more TRSs according to the first portion of the TRS pattern and the second portion of the TRS pattern.

Aspect 48: The method of aspect 47, further including: receiving a request for the second portion of the TRS pattern from the UE based on a high speed of the UE.

Aspect 49: The method of aspect 47 or 48, where the indication of the TRS pattern corresponds to an index of a table of patterns configured at the UE.

Aspect 50: The method of any of aspects 47 through 49, further including: transmitting a MAC-CE to the UE indicating the table of patterns from one or more tables of patterns.

Aspect 51: The method of any of aspects 47 through 50, further including: transmitting RRC signaling to the UE configuring the table of patterns.

Aspect 52: The method of any of aspects 47 through 51, where the indication of the TRS pattern is transmitted via DCI.

Aspect 53: The method of any of aspects 47 through 52, where transmitting the indication of the TRS pattern includes: transmitting DCI allocating an aperiodic resource for the one or more TRSs.

Aspect 54: The method of any of aspects 47 through 53, further including: transmitting an indication of a triggering state from the base station via DCI or a MAC-CE, where the TRS pattern is based on the triggering state.

Aspect 55: The method of any of aspects 47 through 54, where the first portion of the TRS pattern includes a four symbol gap between TRSs, and the first portion and the second portion of the TRS pattern include a two symbol gap between at least two TRSs.

Aspect 56: The method of any of aspects 47 through 55, where a TRS of the second portion of the TRS pattern is between TRSs of the first portion, before the TRSs of the first portion, or after the TRSs of the first portion.

Aspect 57: The method of any of aspects 47 through 56, where the TRS pattern spans a slot or one or more slots.

Aspect 58: The method of any of aspects 47 through 57, where the first portion of the TRS pattern spans a TRS bandwidth, and the second portion of the TRS pattern spans a subset of the TRS bandwidth.

Aspect 59: The method of any of aspects 47 through 58, where the UE is a first UE, further including: transmitting the indication of the TRS pattern to a second UE that is incapable of receiving the second portion of the TRS pattern; and scheduling a downlink shared channel resource for the second UE, where the downlink shared channel resource at least partially overlaps with the second portion of the TRS in time, frequency, antenna port, or any combination thereof, based on a modulation and coding scheme of the second UE being low.

Aspect 60: The method of any of aspects 47 through 59, where the UE is a first UE, further including: scheduling a second UE for a downlink shared channel during a slot including the one or more TRSs, where the second UE is incapable of receiving the second portion of the TRS pattern; and transmitting the indication of the TRS pattern to the second UE, where the indication configures the second UE for a zero-power channel state information reference signal during the second portion of the TRS pattern.

Aspect 61: An apparatus for wireless communication including at least one means for performing a method of any one of aspects 33 through 46.

Aspect 62: An apparatus for wireless communication including a processor; and memory coupled to the processor, the processor and memory configured to perform a method of any one of aspects 33 through 46.

Aspect 63: A non-transitory computer-readable medium storing code for wireless communication including a processor, memory in electronic communication with the processor, and instructions stored in the memory and executable by the processor to cause the apparatus to perform a method of any one of aspects 47 through 60.

Aspect 64: An apparatus for wireless communication including at least one means for performing a method of any one of aspects 47 through 60.

Aspect 65: An apparatus for wireless communication including a processor; and memory coupled to the processor, the processor and memory configured to perform a method of any one of aspects 33 through 46.

Aspect 66: A non-transitory computer-readable medium storing code for wireless communication including a processor, memory in electronic communication with the processor, and instructions stored in the memory and executable by the processor to cause the apparatus to perform a method of any one of aspects 47 through 60.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
   transmit capability information that indicates a capability of the UE to receive tracking reference signals in accordance with at least a second portion of a tracking reference signal pattern that includes a first portion and the second portion;
   receive an indication of the tracking reference signal pattern, wherein the first portion of the tracking reference signal pattern includes a first time gap between tracking reference signal symbols, wherein a combination of the first portion and the second portion of the tracking reference signal pattern includes a second time gap between tracking reference signal symbols, wherein the second time gap is shorter in time relative to the first time gap, and wherein the indication of the tracking reference signal pattern is based at least in part on the capability of the UE to receive tracking reference signals in accordance with at least the second portion of the tracking reference signal pattern; and
   receive a plurality of tracking reference signals separated by the second time gap in accordance with the combination of the first portion of the tracking reference signal pattern and the second portion of the tracking reference signal pattern.

2. The UE of claim 1, wherein the capability information further indicates a capability of the UE to receive tracking reference signals in accordance with the first portion of the tracking reference signal pattern.

3. The UE of claim 1, wherein the one or more processors are further configured to cause the UE to:
   transmit a request for the second portion of the tracking reference signal pattern, wherein the indication of the tracking reference signal pattern is received based at least in part on the request.

4. The UE of claim 3, wherein the one or more processors are further configured to cause the UE to:
   detect a speed of the UE that satisfies a threshold, wherein the request is transmitted based at least in part on satisfaction of the threshold.

5. The UE of claim 1, wherein the first portion of the tracking reference signal pattern and the second portion of the tracking reference signal pattern combined have a shorter symbol period interval between tracking reference signal symbols relative to the first portion of the tracking reference signal pattern.

6. The UE of claim 1, wherein the tracking reference signal pattern spans a slot or a plurality of slots.

7. The UE of claim 1, wherein the first portion of the tracking reference signal pattern spans a tracking reference signal bandwidth, and the second portion of the tracking reference signal pattern spans a subset of the tracking reference signal bandwidth.

8. An apparatus for wireless communication at a network entity, comprising:
one or more memories; and
one or more processors coupled with the one or more memories and configured to cause the network entity to:
obtain capability information that indicates a capability of a user equipment (UE) to receive tracking reference signals in accordance with at least a second portion of a tracking reference signal pattern that includes a first portion and the second portion;
output an indication of the tracking reference signal pattern, wherein the first portion of the tracking reference signal pattern includes a first time gap between tracking reference signal symbols, wherein a combination of the first portion and the second portion of the tracking reference signal pattern includes a second time gap between tracking reference signal symbols, wherein the second time gap is shorter in time relative to the first time gap, and wherein the indication of the tracking reference signal pattern is based at least in part on the capability of the UE to receive tracking reference signals in accordance with at least the second portion of the tracking reference signal pattern; and
output a plurality of tracking reference signals separated by the second time gap in accordance with the first portion of the tracking reference signal pattern and the second portion of the tracking reference signal pattern.

9. The network entity of claim 8, wherein the capability information further indicates a capability of the UE to receive tracking reference signals in accordance with the first portion of the tracking reference signal pattern.

10. The network entity of claim 8, wherein the one or more processors are further configured to cause the network entity to:
obtain a request for the second portion of the tracking reference signal pattern, wherein the indication of the tracking reference signal pattern is outputted based at least in part on the request.

11. The network entity of claim 10, wherein the request is based at least in part on satisfaction of a threshold by a speed of the UE.

12. The network entity of claim 8, wherein the first portion of the tracking reference signal pattern and the second portion of the tracking reference signal pattern combined have a shorter symbol period interval between tracking reference signal symbols relative to the first portion of the tracking reference signal pattern.

13. The network entity of claim 8, wherein the tracking reference signal pattern spans a slot or a plurality of slots.

14. The network entity of claim 8, wherein the first portion of the tracking reference signal pattern spans a tracking reference signal bandwidth, and the second portion of the tracking reference signal pattern spans a subset of the tracking reference signal bandwidth.

15. A method for wireless communications at a user equipment (UE), comprising:
transmitting capability information that indicates a capability of the UE to receive tracking reference signals in accordance with at least a second portion of a tracking reference signal pattern that includes a first portion and the second portion;
receiving an indication of the tracking reference signal pattern, wherein the first portion of the tracking reference signal pattern includes a first time gap between tracking reference signal symbols, wherein a combination of the first portion and the second portion of the tracking reference signal pattern includes a second time gap between tracking reference signal symbols, wherein the second time gap is shorter in time relative to the first time gap, and wherein the indication of the tracking reference signal pattern is based at least in part on the capability of the UE to receive tracking reference signals in accordance with at least the second portion of the tracking reference signal pattern; and
receiving a plurality of tracking reference signals separated by the second time gap in accordance with the combination of the first portion of the tracking reference signal pattern and the second portion of the tracking reference signal pattern.

16. The method of claim 15,
the capability information indicating a capability of the UE to receive tracking reference signals in accordance with the first portion of the tracking reference signal pattern.

17. The method of claim 15, further comprising:
transmitting a request for the second portion of the tracking reference signal pattern, the indication of the tracking reference signal pattern being received based at least in part on the request.

18. The method of claim 17, further comprising:
detecting the UE is moving at a speed that satisfies a threshold, the request being transmitted based at least in part on the speed satisfying the threshold.

19. The method of claim 15, the first portion of the tracking reference signal pattern and the second portion of the tracking reference signal pattern combined having a shorter symbol period interval between tracking reference signal symbols relative to the first portion of the tracking reference signal pattern.

20. The method of claim 15, the tracking reference signal pattern spanning a slot or a plurality of slots.

21. The method of claim 15, the first portion of the tracking reference signal pattern spanning a tracking reference signal bandwidth, and the second portion of the tracking reference signal pattern spanning a subset of the tracking reference signal bandwidth.

22. A method for wireless communications at a network entity, comprising:
obtaining capability information that indicates a capability of a user equipment (UE) to receive tracking reference signals in accordance with at least a second portion of a tracking reference signal pattern that includes a first portion and the second portion;
outputting an indication of the tracking reference signal pattern, wherein the first portion of the tracking reference signal pattern includes a first time gap between tracking reference signal symbols, wherein a combination of the first portion and the second portion of the tracking reference signal pattern includes a second time gap between tracking reference signal symbols, wherein the second time gap is shorter in time relative to the first time gap, and wherein the indication of the tracking reference signal pattern is based at least in part on the capability of the UE to receive tracking reference signals in accordance with at least the second portion of the tracking reference signal pattern; and
outputting a plurality of tracking reference signals separated by the second time gap in accordance with the first portion of the tracking reference signal pattern and the second portion of the tracking reference signal pattern.

23. The method of claim 22, the capability information indicating a capability of the UE to receive tracking reference signals in accordance with the first portion of the tracking reference signal pattern.

24. The method of claim 22, further comprising: obtaining a request for the second portion of the tracking reference signal pattern, the indication of the tracking reference signal pattern being outputted based at least in part on the request.

25. The method of claim 24, the request is based at least in part on a speed of the UE satisfying a threshold.

26. The method of claim 22, the first portion of the tracking reference signal pattern and the second portion of the tracking reference signal pattern combined having a shorter symbol period interval between tracking reference signal symbols relative to the first portion of the tracking reference signal pattern.

27. The method of claim 22, the tracking reference signal pattern spanning a slot or a plurality of slots.

28. The method of claim 22, the first portion of the tracking reference signal pattern spanning a tracking reference signal bandwidth, and the second portion of the tracking reference signal pattern spanning a subset of the tracking reference signal bandwidth.

* * * * *